United States Patent
Yaji et al.

(10) Patent No.: US 11,167,206 B2
(45) Date of Patent: Nov. 9, 2021

(54) PORTABLE MUSIC PLAYING GAME DEVICE

(71) Applicant: CASIO COMPUTER CO., LTD., Tokyo (JP)

(72) Inventors: Yoshitaka Yaji, Tokyo (JP); Kenichi Sakai, Tokyo (JP); Katsuhiko Sasaki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/878,901

(22) Filed: May 20, 2020

(65) Prior Publication Data

US 2020/0368609 A1    Nov. 26, 2020

(30) Foreign Application Priority Data

May 22, 2019   (JP) .............................. JP2019-095660
Feb. 21, 2020   (JP) .............................. JP2020-028816

(51) Int. Cl.
    *A63F 13/211*     (2014.01)
    *A63F 13/54*     (2014.01)
    *A63F 13/814*     (2014.01)

(52) U.S. Cl.
CPC ............ *A63F 13/211* (2014.09); *A63F 13/54* (2014.09); *A63F 13/814* (2014.09); *A63F 2300/105* (2013.01); *A63F 2300/6081* (2013.01); *A63F 2300/8047* (2013.01)

(58) Field of Classification Search
CPC ...... A63F 13/211; A63F 13/92; A63F 13/814; A63F 2300/8047; A63F 2300/105
See application file for complete search history.

(56) References Cited

U.S. PATENT DOCUMENTS

| | | | | |
|---|---|---|---|---|
| 5,081,896 A | * | 1/1992 | Hiyoshi | ................... G10H 1/00 250/221 |
| 2012/0295763 A1 | * | 11/2012 | Lin | ..................... A63B 24/0062 482/4 |
| 2015/0057966 A1 | * | 2/2015 | Winter | ............... G09B 19/0038 702/141 |

(Continued)

FOREIGN PATENT DOCUMENTS

| JP | H03-289975 A | 12/1991 |
|---|---|---|
| JP | H05-115617 A | 5/1993 |

(Continued)

OTHER PUBLICATIONS

"[Musical instrument playing] Pad score Part 1", [online],2019, Mar. 24, 2021, search on Jul. 9, 2016, Internet < URL: https://jp.finalfantasyxiv.com/lodestone/character/12933504/blog/4065134/> Cited and discussed on p. 10, lines 15-20 of the Japanese Office Action below as a concise explanation of relevance.).

(Continued)

*Primary Examiner* — James S. McClellan
(74) *Attorney, Agent, or Firm* — Chen Yoshimura LLP

(57) ABSTRACT

A portable device includes a speaker; a first sensor that detects movement of the device; a second sensor that detects a direction in which the device is facing; and a controller that, when time-series variation of the movement detected by the first sensor indicates a jump movement, causes a sound corresponding to the direction detected by the second sensor to be output from the speaker.

8 Claims, 28 Drawing Sheets

(56) References Cited

U.S. PATENT DOCUMENTS

2018/0286366 A1\* 10/2018 Oguro .................. G10H 1/368
2020/0230486 A1\* 7/2020 Shau .................... A63B 69/18

FOREIGN PATENT DOCUMENTS

| JP | H09-218639 A | 8/1997 |
| JP | H11-126063 A | 5/1999 |
| JP | 2003-116177 A | 4/2003 |
| JP | 2013-44889 A | 3/2013 |
| WO | 2017/195390 A1 | 11/2017 |

OTHER PUBLICATIONS

Japanese Office Action dated Jul. 20, 2021 in a counterpart Japanese patent application No. 2020-028816. (A machine translation (not reviewed for accuracy) attached.).

\* cited by examiner

PORTABLE MUSIC PLAYING GAME DEVICE

BACKGROUND OF THE INVENTION

Technical Field

This disclosure relates to a portable music playing game device and devices and method related thereto.

Background Art

Playgrounds and amusement parks are typically equipped with not only simple playground equipment, such as swings and seesaws, but also more complex equipment, which involves more complex movements or water emission, attracting children more. See Patent Documents: Japanese Application Publication Nos. H03-289975 and H05-115617.

By playing with these types of equipment, children are expected to develop athletic ability as well as social skills by sharing playground equipment.

Because these types of playground equipment need to be fixed to the ground with a sufficient prescribed strength, installation work that requires a certain time to complete is required. Further, in order to avoid accidents due to equipment deterioration, maintenance and inspection are necessary throughout the usage period of the equipment. Because of this, playground equipment with less installation time and work and with less maintenance and inspection burden has been sought after. Furthermore, for playgrounds and amusement parks, in order to attract repeating visitors, it is desirable to have playground equipment with variable features so that visitors can repeatedly enjoy different variations of it.

The present invention is devised in light of the foregoing, and aims to provide a novel music playing game device and various devices and method related thereto.

SUMMARY OF THE INVENTION

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, in one aspect, the present disclosure provides a portable device includes a speaker; a first sensor that detects movement of the device; a second sensor that detects a direction in which the device is facing; and a controller that, when time-series variation of the movement detected by the first sensor indicates a jump movement, causes a sound corresponding to the direction detected by the second sensor to be output from the speaker.

In another aspect, the present disclosure provides a non-transitory computer readable storage medium storing a program executable by a controller of a portable device including, in addition to said controller, a speaker; a first sensor that detects movement of the device; and a second sensor that detects a direction in which the device is facing, the program causing the controller to perform the following: when time-series variation of the movement detected by the first sensor indicates a jump movement, causing a sound corresponding to the direction detected by the second sensor to be output from the speaker.

In another aspect, the present disclosure provides portable device, comprising a display unit; and a controller that causes the display unit to display playing instructions indicating notes to be played in terms of directions.

It is to be understood that both the foregoing general description and the following detailed description are exemplary and explanatory, and are intended to provide further explanation of the invention as claimed.

DETAILED DESCRIPTION OF EMBODIMENTS

Embodiments of the present invention are described below. A music playing game device according to a first embodiment of the present invention emits sound in accordance with jumping motions of a user who holds the device.

In more detail, the pitch of the sound emitted is associated with the direction of the jump of the user, the volume of the sound is associated with the height of the jump, and the duration of the sound is associated with the distance of the jump. When the user jumps at the same position (jumping only vertically), the pitch of the sound is associated with the direction in which the user is facing.

By jumping in various directions while holding this device, the user can enjoy playing music as well as performing physical exercises. Furthermore, by installing software on a smart phone (mobile device) owned by a user that causes the smart phone to function as this music playing game device, music playing instructions, which include the direction and distance of each jump, may be drawn on the ground, constituting a playground equipment.

This can significantly reduce the cost for maintenance and inspection. Furthermore, such playing instructions can easily be renewed or modified, thereby promoting repeated visits to the playground site.

Playing Overview

Figure 1:
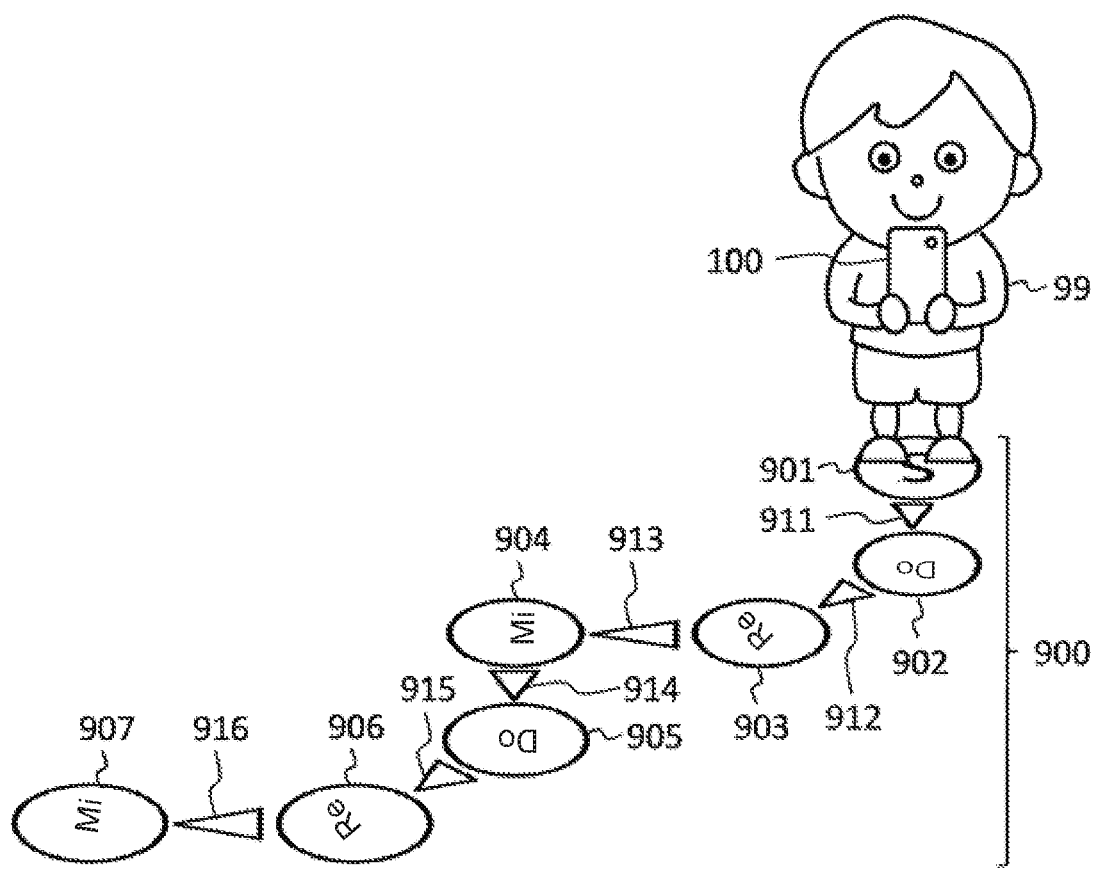
FIG. 1 schematically shows how to play a music playing game device according to a first embodiment of the present invention.

FIG. 1 schematically explains how to play a music playing game device (playing device) 100 according to a first embodiment of the present invention. When a user 99, who folds the playing device 100, jumps in accordance with the playing instructions 900 that have been drawn on the ground, the playing device 100 emits sounds corresponding to the jumps performed by the user.

The playing instructions 900 include start point 901, note points 902 to 907, and triangles 911 to 916 that are disposed between the start point 901 and note points 901 to 907. The triangles 911 to 916 indicate the playing order of the note points 902-907.

If the user 99 starts with the start point 901 and jumps to note points 902-907 in the order as indicated by the triangles 911 to 916, respectively, the playing device 100 detects the directions, heights, and the distances of the respective jumps and emits sounds corresponding to the detected directions, heights, and distances.

Here, the expression, "the user 99 jumps from the start point 901 to the note point 902," as used herein, means that the user 99 jumps from the start point 901 and lands on the note point 902. The expression, "the user 99 jumps from the note point 902 to note point 903" has a similar meaning.

Figure 2:
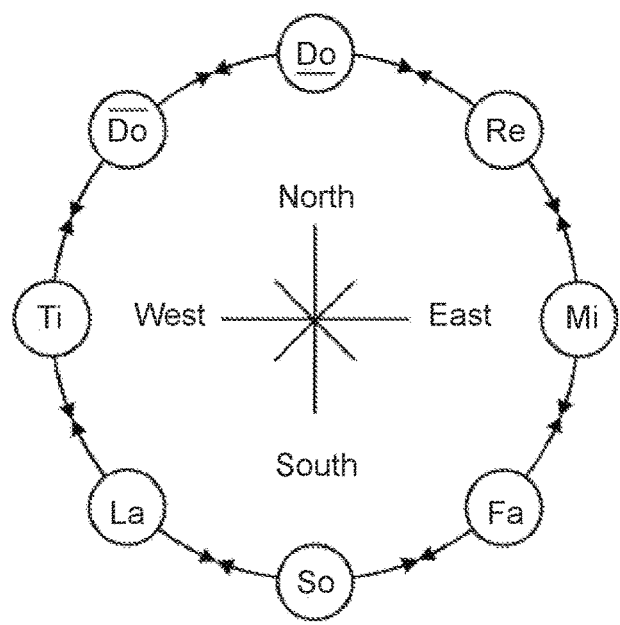
FIG. 2 shows a relationship between the direction of jump and the pitch of a note produced in the first embodiment.

FIG. 2 shows a relationship between the direction of the jump and the pitch of a note produced in the first embodiment. The playing device 100 detects the direction of the jump as one of north, northeast, east, southeast, south, southwest, west, and northwest, and emits the corresponding pitch of Do, Re, Mi, Fa, So, La, Ti, and Do (octave above), respectively. Here, Do with an upper bar at northwest is octave higher than Do with a lower bar at north.

Figure 3:
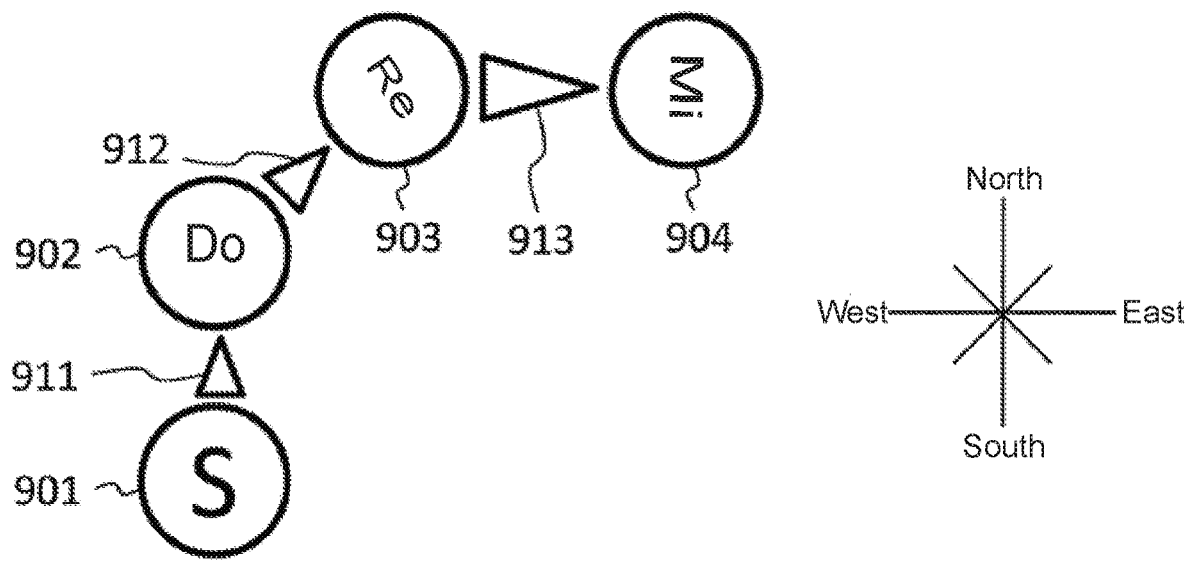
FIG. 3 is a drawing used to explain a relationship between the distance of the jump and the duration of the note produced in the first embodiment.

FIG. 3 is referred to in order to explain a relationship between the distance of the jump and the duration of the note produced in the first embodiment. FIG. 3 is a part of the playing instructions 900 shown in FIG. 1 and is a top view of the start point 901, note points 902 to 904, and the triangles 911 to 913, as seen from above. The top of the drawings is the north direction.

The triangle 913 is longer than the triangles 911 and 912, which indicates that the jump distance to the note point 904 is longer than the jump distances to the note points 902 and 903. Also, the note point 902 is located north of the start point 901, the note point 903 is northeast of the note point 902, and the note point 904 is east of the note point 903, which respectively correspond to do, re, and mi. If the user (performer) 99 starts with the start point 901 and successively jumps to the nots points 902 to 904 in that order, the playing device 100 emits sounds of do, re, and long mi.

Here, the note points 903 and 904 are rotated so that the notes points 903 and 904 are readily seen from the locations of the preceding note points 902 and 903, respectively.

Overall Structure of Playing Device

Figure 4:
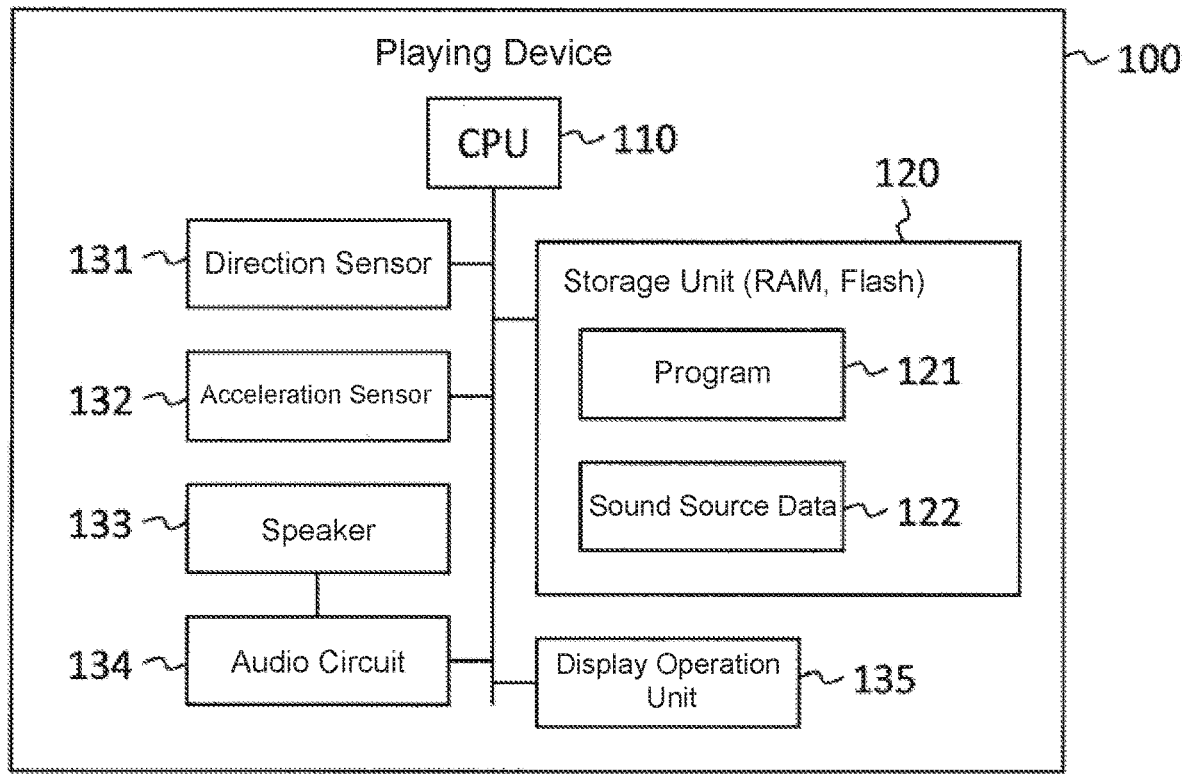
FIG. 4 is a block diagram showing an overall configuration of the music playing game device of the first embodiment.

FIG. 4 is a block diagram showing an overall configuration of the music playing game device 100 of the first embodiment. The playing device 100 contains a CPU (Central Processing Unit) 110, a storage unit 120 that includes RAM (Random Access Memory), a direction sensor 131, an acceleration censor 132, a speaker 133, an audio circuit 134, and a display operation unit 135.

The storage unit 120 stores program 121 and sound source data 122. CPU 110 executes the program 121 to realize playing functions of the playing device 100 (the playing process as will be mentioned with reference to FIG. 9 below). The sound source data 122 are original sound data for tones corresponding to various jumps and various musical instruments.

The direction sensor 131 is a sensor that detects the direction of the jump, and outputs to the CPU 110 a signal representing the detected strengths of the geomagnetism with respect to the XYZ axes of the playing device 100, for example. The acceleration sensor 132 is a sensor that detects the acceleration, and outputs to the CPU 110 a signal representing the detected acceleration values with respect to the XYZ axes, for example.

The audio circuit 134 is a D/A converter, and converts instrumental sound data in the sound source data 122 to analogue signals in accordance with instructions from the CPU 110. The analogue signals are output to the speaker 133 so that the speaker 133 emits the corresponding sound.

The display operation unit 135 is a touch panel display for displaying various screen images, which will be described later with reference to FIG. 6 and other figures. The display operation units 135 also functions as an operation unit that receives operations by the user 99.

Playing Procedure

Figure 5:
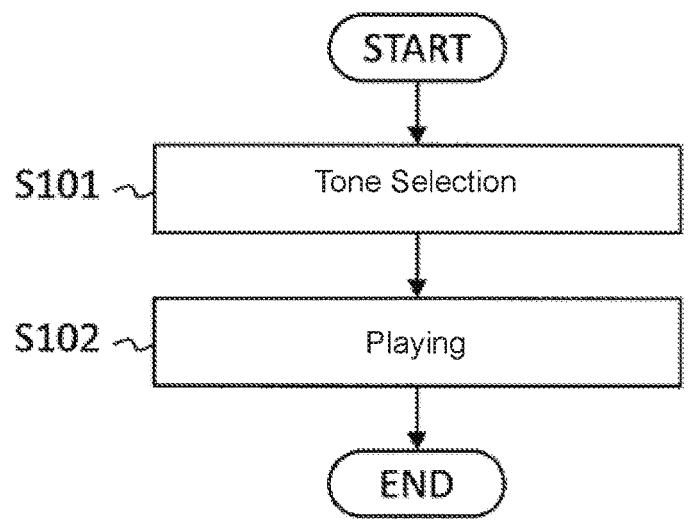
FIG. 5 is a flowchart showing a playing procedure of the music playing game device of the first embodiment.

FIG. 5 is a flowchart showing a playing procedure in the first embodiment. At step S101, the user 99 selects the tone. In more detail, the user 99 selects one of the preset tones stored in the sound source data 122, which will be emitted by the playing device 100. The process performed by the CPU 110 in response to the user selection of the tone will be explained later with reference to FIGS. 7 and 8.

At step S102, the user 99 jumps while holding the playing device 100. The playing process performed by the CPU 110 in response to the user performance will be described later with reference to FIGS. 9 to 13.

Screen Images

Figure 6:
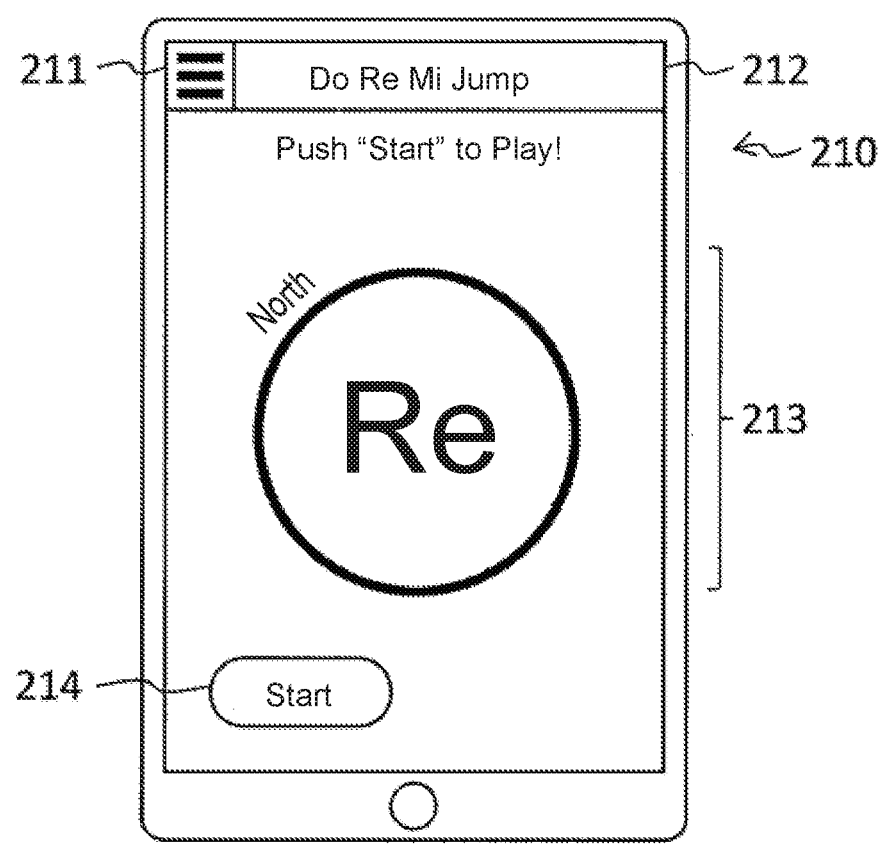
FIG. 6 shows a screen image displayed in the music playing game device of the first embodiment before start playing it.

FIG. 6 shows a screen image 210 displayed in the music playing game device 100 of the first embodiment before the user starts playing it. The screen image 210 is an initial screen image when the CPU 110 executes program 121. The title region 212 of the screen image 210 shows "Do Re Mi Jump," indicating that the program 121 is running.

When the menu button 211 is tapped by the user, a menu (not shown in the figure) is displayed, and by way of the user selection, the tone selection screen (see FIG. 8 described below), music selection screen (see FIG. 15 described below), and scale selection screen (not shown in the drawing) may be selected.

The user 99 taps the "Start" button 214 to start performance (jump). The "Start" button 214 toggles with "Stop" button 214A (see FIG. 11 described below), and switches between the "Start" button 214 and the "Stop" button 214A every time it is tapped.

The direction display region 213 indicates the direction in which the user is facing and the pitch of the note produced when the user jumps in that direction. In more detail, the CPU 110 assumes that the user (performer) 99 hold the playing device 100 vertically with the display operation unit 135 facing towards the user 99 (see FIG. 1), and causes the display operation unit 135 to display a direction detected by the direction sensor 131, which is opposite to the direction in which the display operation unit 235 is facing. The pitch associated with that direction is also displayed in the direction display region 213.

Tone Selection Process

Figure 7:
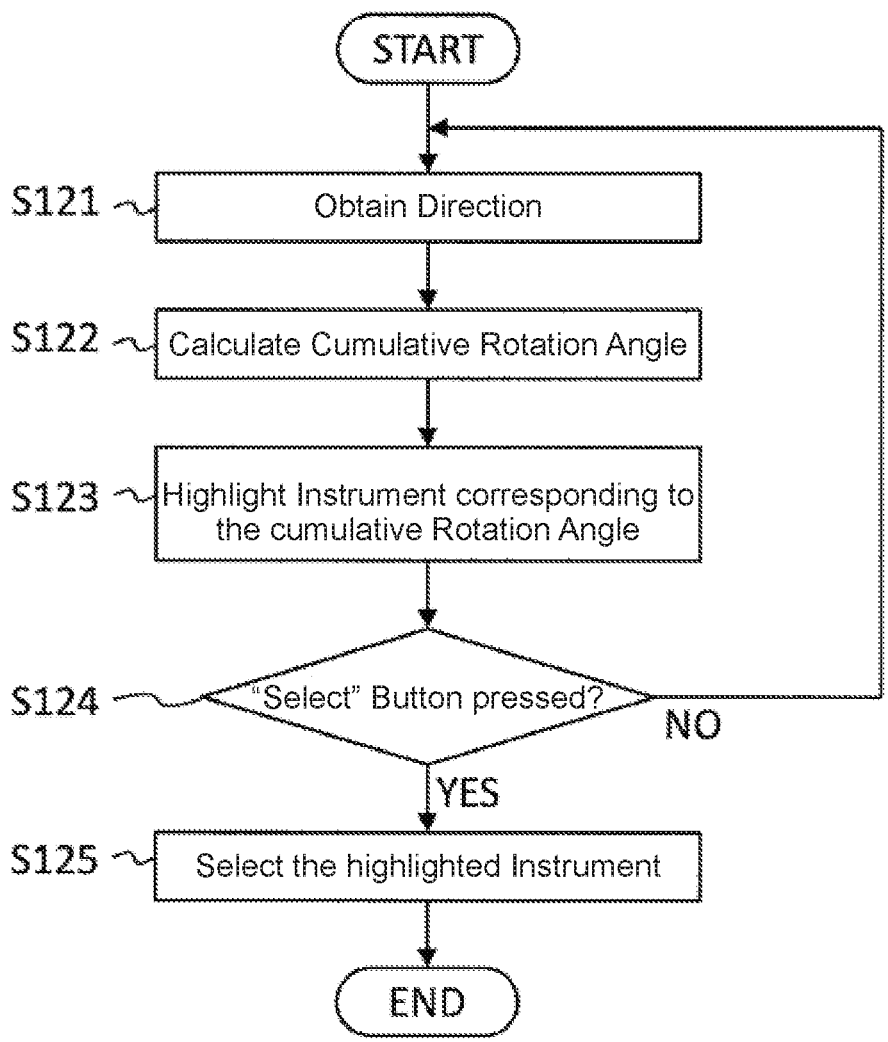
FIG. 7 is a flowchart showing a tone selection process in the first embodiment.

FIG. 7 is a flowchart showing a tone selection process in the first embodiment. The tone selection process is a process performed by the CPU 110 in response to the tone selection by the user 99 (see step S101 of FIG. 5). Before explaining the tone selection process, the tone selection performed by the user 99 will be explained with reference to FIG. 8.

Figure 8:
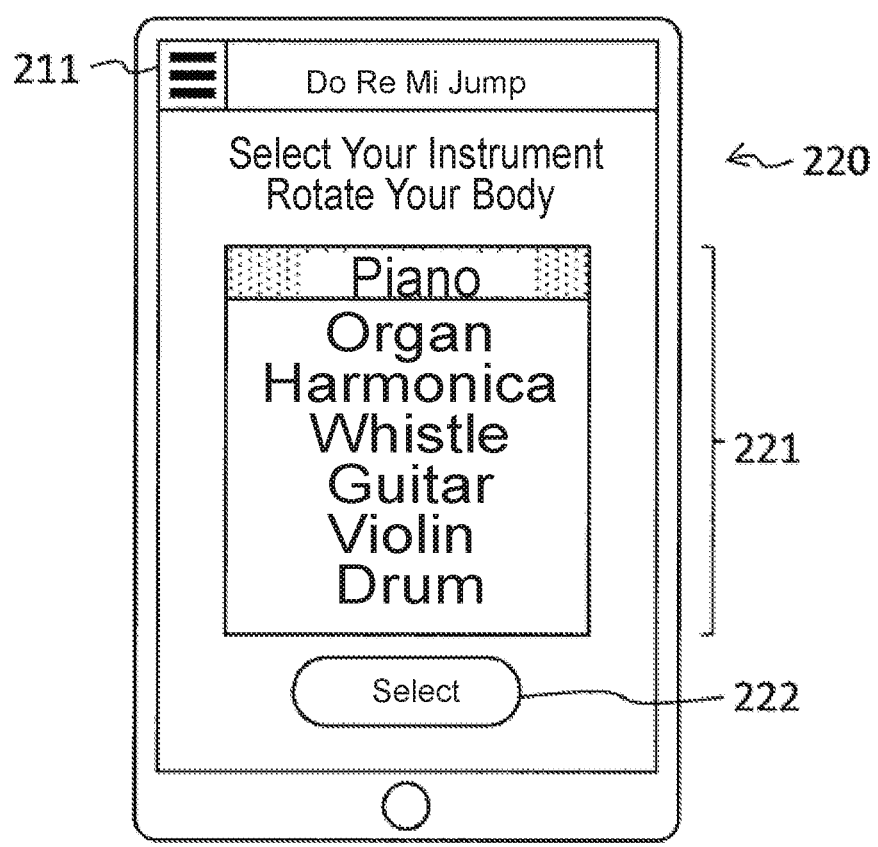
FIG. 8 shows a tone selection screen image displayed in the music playing game device of the first embodiment.

FIG. 8 shows a tone selection screen image 220 displayed in the music playing game device 100 of the first embodiment. The user 99 operates the menu 211 (see FIG. 6) to switch to the tone selection screen 220. In the instrument selection region 221, a currently selected instrument is highlighted. In FIG. 8, piano is highlighted, indicating that piano sounds are produced in response to jumps if the selection is finalized.

When the user 99 rotates his/her body while holding the playing device 100, the highlighted instrument in the instrument selection region 221 is switched according to the rotation, and the user 99 can confirm the highlighted instrument. Once the desired instrument is highlighted, the user 99 taps the "Select" button 222 to finalize the selection.

Returning to FIG. 7, the tone selection process performed by the CPU 110 will be explained. When the menu 211 (see FIG. 6) is operated and the tone selection screen image 220 appears, the CPU 110 starts the tone selection process. The tone selection process is a process that repeatedly perform steps S121 to S124. At step S121, the CPU 110 obtains the current direction from the direction sensor 131.

At step S122, the CPU 110 calculates the cumulative rotation angle since the start of the tone selection process. In more detail, the CPU 110 repeats step S121 that obtains the direction in order to obtain the cumulative rotation angle. For example, if the direction is initially north, and if thereafter, east, south, west, south west, north and east are subsequently detected, the resultant cumulative rotation angle would be (90+90+90−90+90+90+90)=450 degrees.

At step S123, the CPU 110 highlights the instrument in the instrument selection region 221 (see FIG. 8) in accordance with the calculated cumulative rotation angle obtained in step S122. In this embodiment, the CPU 110 switches the highlighted instrument every 60 degrees of the cumulative rotation angle. For example, if the cumulative rotation angle is between −30 degrees to 30 degrees, piano is highlighted, if it is between 30 degrees to 90 degrees, organ is highlighted, if it is between 90 degrees to 150 degrees, harmonica is highlighted, and so on so forth.

At step S124, if the CPU detects a tapping operation on the "Select" button 222 (step S124->YES), the process advances to step S125, and if the CPU does not detect a tapping operation (S124->NO), the process returns to step S121.

At step S125, CPU 110 selects and stores the instrument that was highlighted in the instrument selection region 221 as the instrument the tone of which is to be emitted by the speaker 133.

Playing Process

Figure 9:
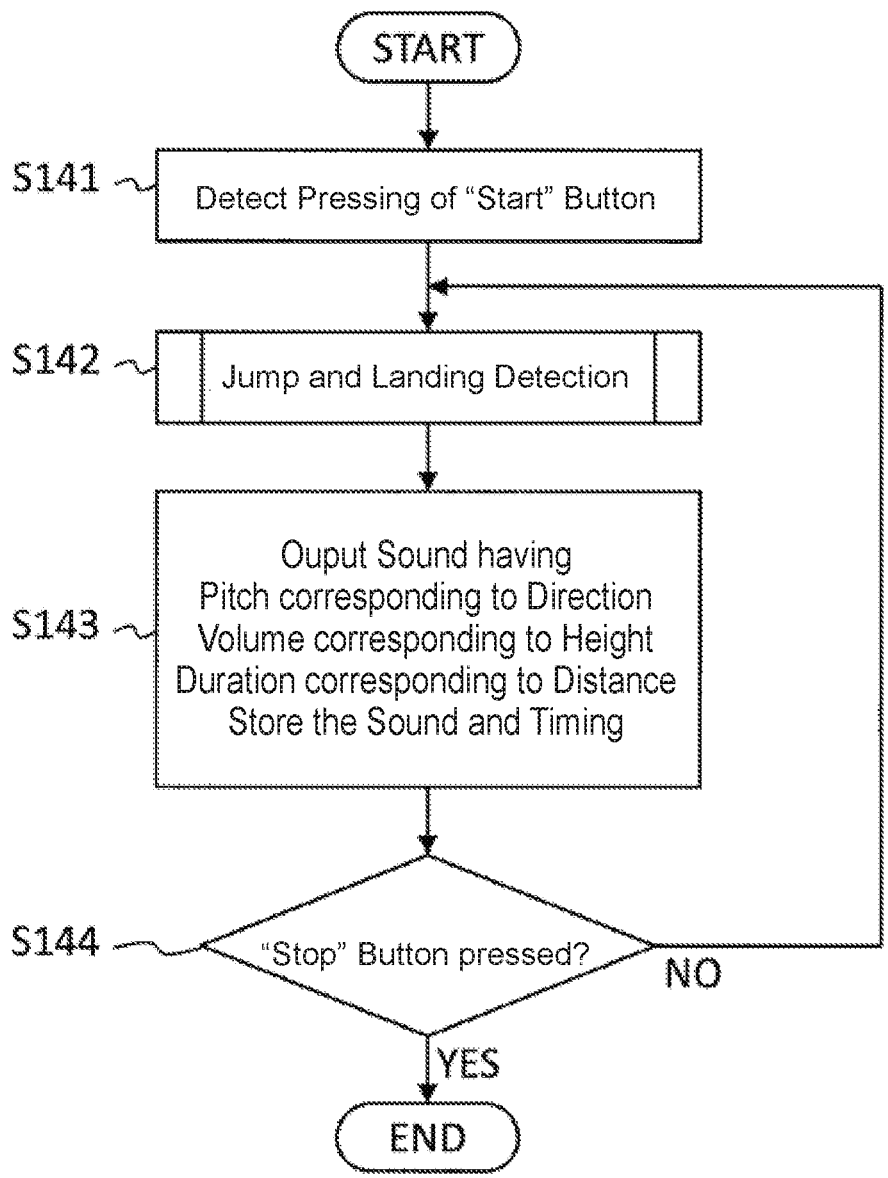
FIG. 9 is a flowchart showing a playing process of the first embodiment.

FIG. 9 is a flowchart showing a playing process of the first embodiment. The playing process is performed by the CPU 110 in response to the playing of the user 99 (see step S102 of FIG. 5). Before explaining the playing process, processes for detecting jump and landing and for calculating the direction, height and distance of the jump will be explained with reference to FIG. 10.

Figure 10:
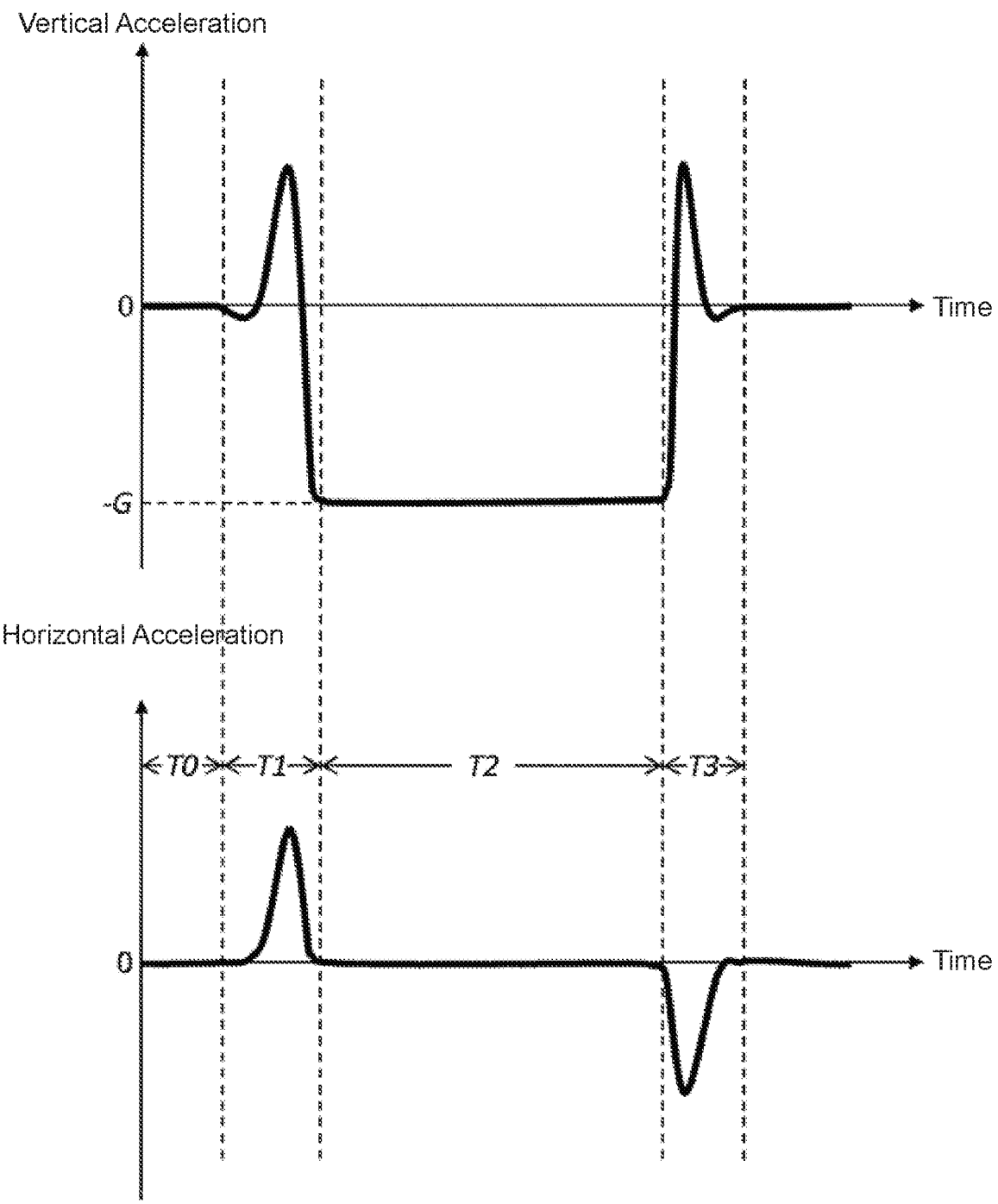
FIG. 10 shows graphs for explaining processes for detecting a jump and a landing and for calculating the direction, height and distance of the jump in the first embodiment.

FIG. 10 shows graphs for explaining processes for detecting a jump and a landing and for calculating the direction, height and distance of the jump in the first embodiment. The top graph of FIG. 10 shows accelerations in the vertical direction as time elapses, obtained from outputs from the acceleration sensor 132. The playing device 100 is receiving gravitational force while it is at rest in the time period T0. The CPU 110 calculates the direction of the gravitational force based on outputs from the acceleration sensor 132, and regards a direction opposite to the detected direction of the gravitational force as the vertical direction. The CPU 110 then determines this resting state as the state of zero acceleration and calibrates acceleration detections.

The bottom graph of FIG. 10 shows accelerations in the horizontal direction as time elapses, obtained from outputs from the acceleration sensor 132. The horizontal direction is a direction perpendicular to the vertical direction, and is a direction in which the gravitational acceleration becomes zero at rest. The jump direction is a direction in which the horizontal acceleration is the largest during the time period T1 which is time until the jump occurs.

The time period T0 is a time period during which the user is not moving his/her body. Thus, the vertical and horizontal accelerations are both zero.

The time period T1 is a time period until the jump occurs, which starts when the user starts moving his/her body and ends when the feet leave the ground. During this period, the upward acceleration is dominant in the vertical acceleration, and the horizontal acceleration is generated in the direction of the jump.

The time period T2 is a time period during which the user's body is floating in the air. During that time, the gravitational acceleration (−G) is detected in the vertical direction. The horizontal acceleration is zero.

The time period T3 is a time period that starts when the user 99 lands and ends when the user 99 stops moving thereafter. During this period, the downward velocity at which the user is descending becomes zero, and therefore the upward acceleration is dominant. In the horizontal direction, the velocity in the direction of the jump becomes zero, and therefore, the acceleration in a direction opposite to the direction of jump is generated. After the time period T3, the vertical and horizontal accelerations are both zero. Thereafter, the time periods T0 to T3 are going to be repeated.

If the user 99 jumps at the same position with the jump distance being zero, the vertical acceleration will be similar to the one shown in the top graph of FIG. 10, and the horizontal acceleration will be zero or smaller than a prescribed minimum threshold.

The time period T0 can be detected as a period during which the vertical and horizontal accelerations are both zero (i.e., detecting acceleration less than a prescribed minimum threshold). The time period T1 can be detected as a period that follows T0 during which the vertical acceleration changes (i.e., an acceleration greater than a prescribed value is detected) and that ends when the gravitational acceleration is detected (i.e., an acceleration having a difference from the gravitational acceleration being less than a prescribed minimum threshold is detected). The time period T2 can be detected as a time period that follows T1, during which the gravitational acceleration is being detected. The time period T3 can be detected as a time period that follows T2, during which the gravitational acceleration is no longer detected (i.e., an acceleration having a difference from the gravitational acceleration greater than a prescribed value is detected) and that ends when the vertical and horizontal accelerations both become zero (i.e., an acceleration smaller than a prescribed minimum threshold is detected).

Assuming that the user 99's jump follows a parabola trajectory (i.e., the user 99 does parabolic movement), the CPU 110 calculates the height and direction of the jump based on the initial velocity of the jump. This will be explained below.

The CPU 110 can calculate the upward velocity (initial vertical velocity) at the start of the jump by integrating the vertical accelerations during the time period T1 and can thereby calculate the height of the jump.

The CPU 110 can detect the direction of the jump (the direction relative to the playing device 100) by calculating a direction in which the horizontal acceleration is the largest during the time period T1. The orientation in which the playing device 100 is facing (in terms of compass point: east, west, south, or north) can be calculated by outputs from the direction sensor 131, and the direction (compass point) of the jump can be thereby detected. In calculating the direction (compass point), an error margin of +−22.5 degrees is taken into account. For example, if 28 degrees is detected relative to north, which is set to zero degree, because 28 degrees is within +−22.5 degrees from 45 degrees, the CPU 110 determines the detected 28 degrees to to be northeast.

The CPU 110 also can calculate the velocity in the direction of the jump (initial horizontal velocity) by integrating the accelerations in the direction of the jump during the time period T1, and can thereby calculate the distance of the jump.

Playing Process: Flow of Playing Process

Returning to FIG. 9, the playing process will be explained.

Figure 11:
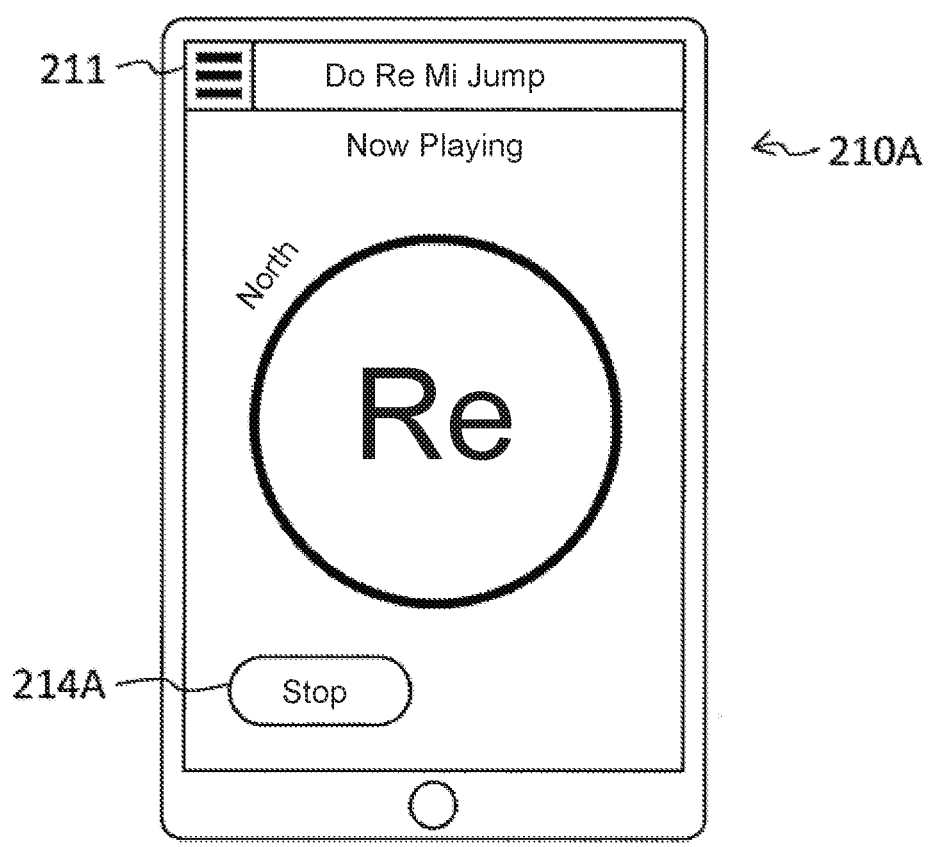
FIG. 11 shows a screen image displayed during the playing of the music playing game device of the first embodiment.

At step S141, the CPU 110 detects the user's tap on the "Start" button 214 (see FIG. 6). Thereafter, the playing device 100 is placed in the playing mode. FIG. 11 shows a screen image 210A displayed during the playing in the first embodiment. At the top of the playing screen 210A, "Now Playing" is displayed, indicating that it is in the playing mode. The "Start" button 214 (see FIG. 6) has changed to the "Stop" button 214A.

Returning to FIG. 9, at step S142, the CPU 110 performs the jump and landing detection process. The jump and landing detection process will be explained with reference to FIG. 13 below.

At step S143, the CPU 110 causes a sound having a pitch corresponding to the jump direction, a volume corresponding the jump height, and a duration corresponding to the jump direction to be output. Then, the CPU 110 stores the height, volume, and the duration of the sound as well as the timing of the sound output (time from the start of the processing).

If a tap on the "Stop" button 214A is detected at step S144 (step S144->YES), the CPU 110 terminates the playing process, and if such a tap is not detected (step S144->NO), the process returns to step S142.

Figure 12:
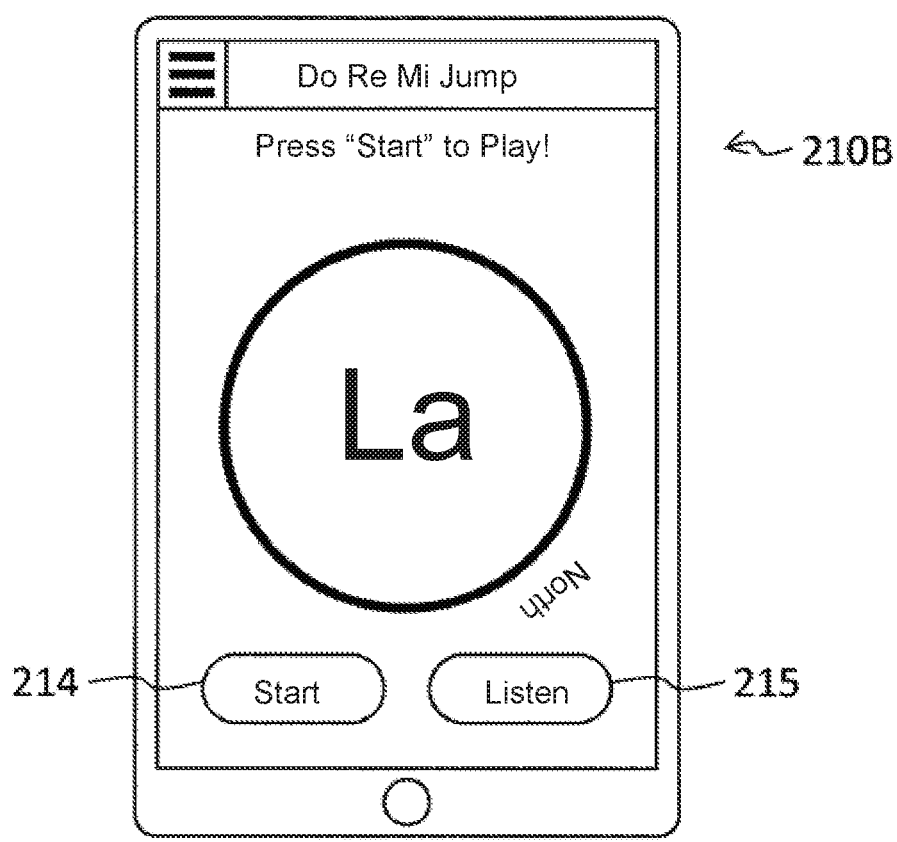
FIG. 12 shows a screen image displayed after the playing of the music playing game device of the first embodiment.

FIG. 12 shows a screen image 210B displayed after the playing of the music playing game device in the first embodiment. The "Stop" button 214A (see FIG. 11) has changed to the "Start" button 214, and the "Listen" button 215 is displayed. If the "Listen" button is tapped, the sound with the pitch, volume, and the duration that have been stored at step S143 will be reproduced (the sound is emitted) at the stored timing.

Playing Process: Jump and Landing Detection

Figure 13:
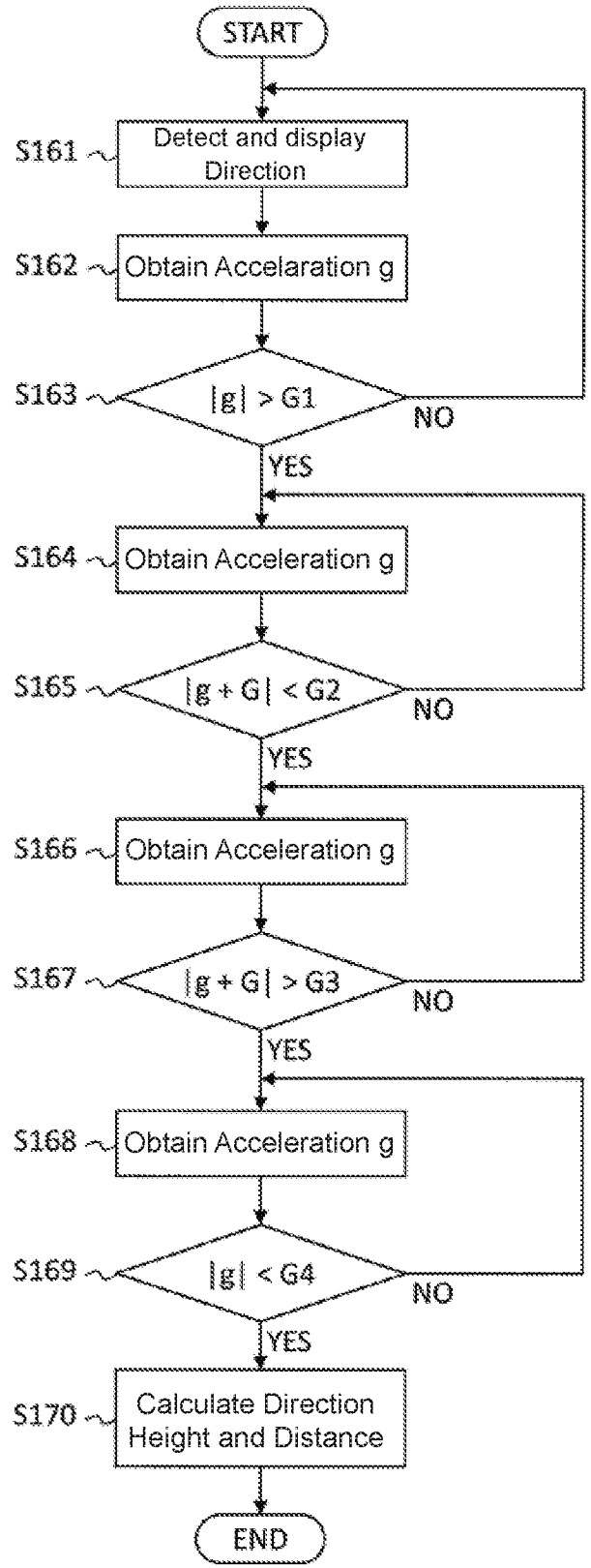
FIG. 13 is a flowchart showing a process for detecting a jump and a landing.

FIG. 13 is a flowchart showing a process for detecting a jump and a landing. Referring to FIG. 13, the jump and landing detection process of step S142 (see FIG. 9) will be explained.

At step S161, the CPU 110 detects the direction and displays the detected direction in the direction display region 213 (see FIG. 6). The process of displaying was explained with reference to FIG. 6 above.

At step S162, the CPU 110 obtains the vertical acceleration g from the acceleration sensor 132.

At step S163, if the magnitude of g (the absolute value of g |g|) is greater than a prescribed value G1 (step S163->YES), the process goes to step S164, and if not (step S163->NO), the process returns to step S161. Advancing to step S164 means that the time period T0 ended and the time period T1 started (see FIG. 10).

At step S164, the CPU 110 obtains the vertical acceleration g from the acceleration sensor 132.

At step S165, if the difference between g and the gravitational acceleration (|g−(−G)|=|g+G|) is smaller than a prescribed value G2 (step S165->YES), the process goes to step S166, and if not (step S165->NO), the process returns to step S164. Advancing to step S166 means that the time period T1 ended and the time period T2 started.

At step S166, the CPU 110 obtains the vertical acceleration g from the acceleration sensor 132.

At step S167, if the difference between g and the gravitational acceleration (|g+G|) is greater than a prescribed value G3 (step S167->YES), the process goes to step S168, and if not (step S167->NO), the process returns to step S166. Advancing to step S168 means that the time period T2 ended and the time period T3 started.

At step S168, the CPU 110 obtains the vertical acceleration g from the acceleration sensor 132.

At step S169, if the magnitude of g (|g|) is less than a prescribed value G4 (step S169->YES), the process goes to step S170, and if not (step S169->NO), the process returns to step S168. Advancing to step S170 means that the time period T3 ended and the next time period T0 started.

At step S170, the CPU calculates the direction, height, and distance of the jump. The calculation method has been already explained above with reference to FIG. 10.

Playing Procedure with Onscreen Instructions

In the playing procedures described above, the user 99 jumps in accordance with the playing instructions 900 having note points 902-2907 drawn on the ground (see FIG. 1). Next, a paying procedure when the user looks at playing instructions displayed on the display operation unit 135 of the music playing game playing device 100 will be explained (see the playing instructions display region 241 in FIG. 17, which will be described below).

Figure 14:
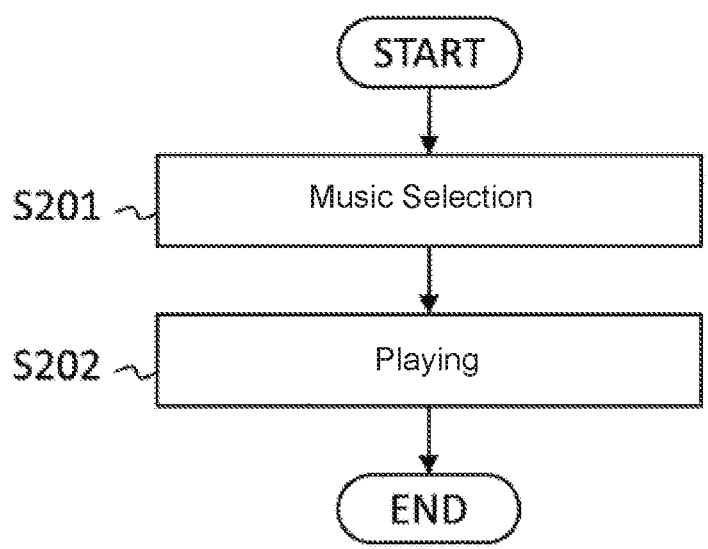
FIG. 14 is a flowchart showing a playing procedure when the music playing game device shows playing instructions in the first embodiment.

FIG. 14 is a flowchart showing the playing procedure when the music playing game device shows the playing instructions in the first embodiment.

Figure 15:
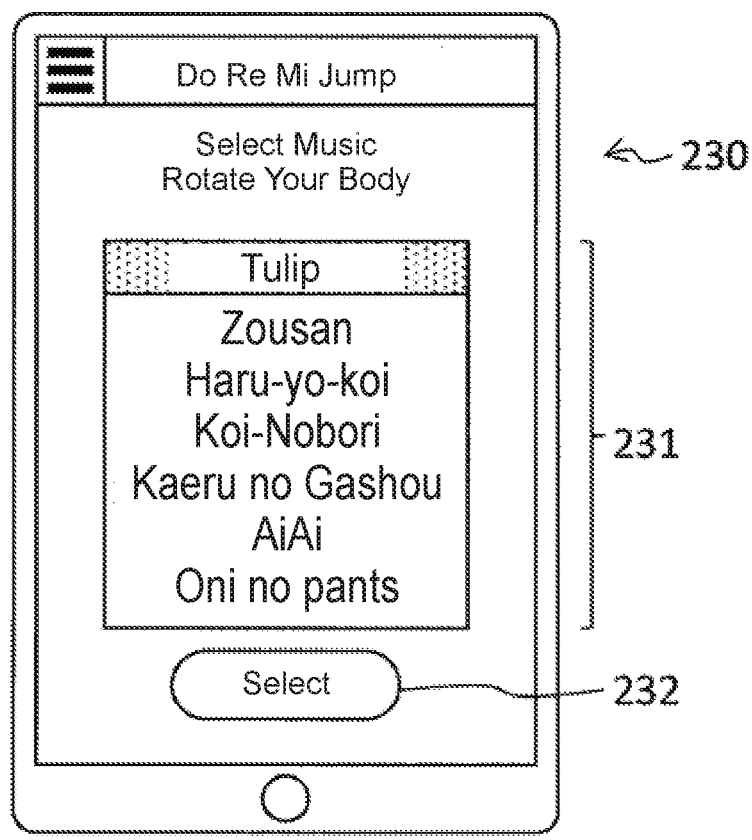
FIG. 15 shows a music selection screen in the music playing game device of the first embodiment.

At step S201, the user 99 selects a music piece to play. FIG. 15 shows a music selection screen image 120 in the first embodiment. The user 99 operates the menu 211 (see FIG. 6) to switch to the music selection screen 230. In the music selection region 231, a currently selected music piece is highlighted. In FIG. 15, "Tulip" is selected, which means that the playing instructions for "Tulip" will be displayed in the display operation unit 135 (see FIG. 17, described below).

When the user 99 rotates his/her body while holding the playing device 100, the selected music piece in the music selection region 231 is switched so that the user 99 can confirm the highlighted music piece. Once the desired music pieces is highlighted, the user 99 taps the "Select" button 232 ("Select" in FIG. 15) to finalize the selection.

The process performed by the CPU in the music selection is similar to the tone selection process (FIG. 7). In more detail, at step S123, a music piece, instead of a music instrument, is highlighted, and at step S125, the highlighted music piece is selected and stored as a music piece for which the playing instructions will be displayed.

Returning to FIG. 14, at step S202, the user 99 plays the playing device 100 by jumping while holding the playing device 100. The playing process performed by the CPU 110 in response to the user 99's jumps will be explained with reference to FIGS. 16-19.

Playing Process with Onscreen Instructions

Figure 16:
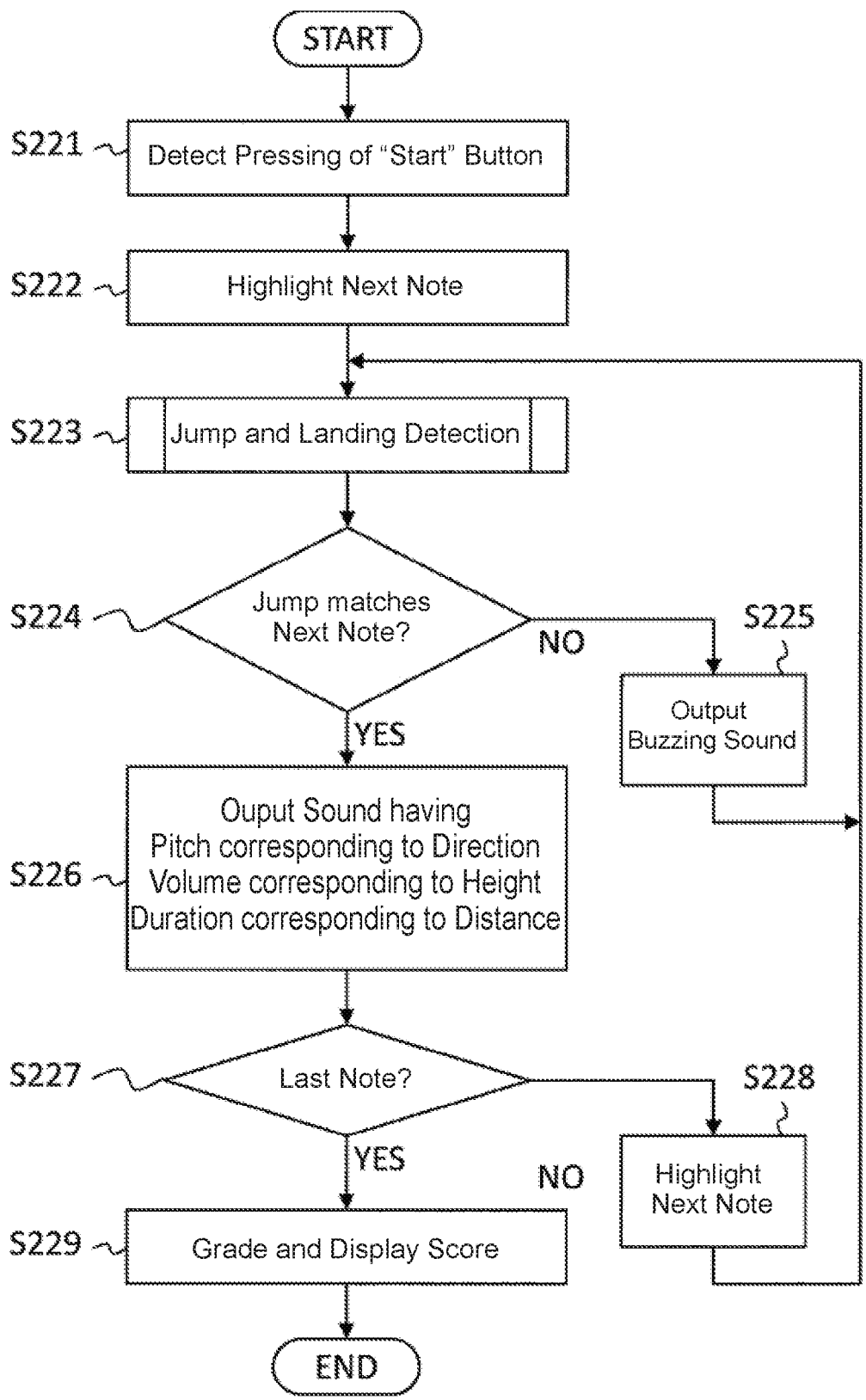
FIG. 16 is a flowchart showing a playing process when the music playing game device shows playing instructions in the first embodiment.

FIG. 16 is a flowchart showing a playing process when the device shows playing instructions in the first embodiment. The playing process is performed by the CPU 110 in response to the user 99's playing (see step S202 in FIG. 14). When the CPU detects a tap on the "Select" button 232 in the music selection screen 230 (see FIG. 15), the CPU displays the playing screen image 240 (see FIG. 17 described below) to start the playing process.

Figure 17:
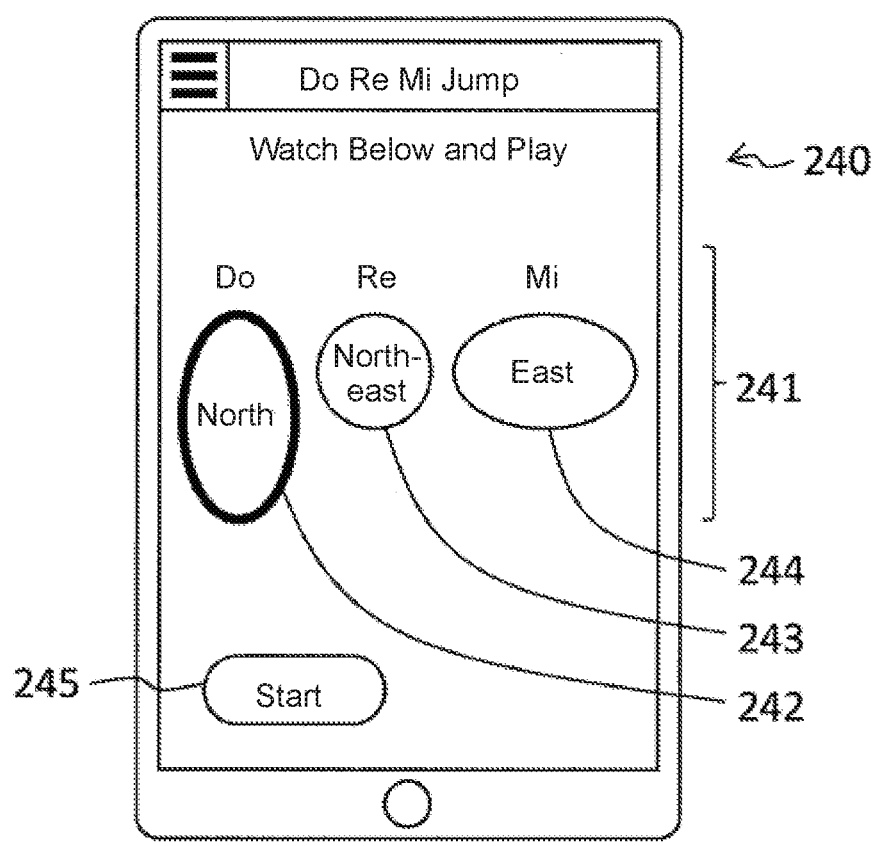
FIG. 17 is a screen image shown in the music playing game device of the first embodiment when the music playing game device shows playing instructions.

FIG. 17 is the playing screen image 240 shown in the music playing game device 100 of the first embodiment when the playing device 100 shows playing instructions. The user taps the "Start" button 245 to start performance (jump). The "Start" button toggles with the "Stop" button 245A (see FIG. 18 described below), and switches between the "Start" button 245 and the "Stop" button 245A every time it is tapped.

In the playing instructions display region 241, note symbols 242 to 244 are displayed in the order to be played from the left to the right as the playing instructions for the selected music piece. The note to be played next is shown by bold lines. In FIG. 17, the note represented by the note symbol 242 is to be played next.

At each of the note symbols 242 to 244, the direction of jump that corresponds to the pitch of the note is indicated by letters.

The vertical length of each of note symbols 242 to 244 indicates the height of the jump for the note, which corresponds to the volume of the note. For example, the note symbol 242 is vertically longer than the note symbols 242 and 243, indicating that the user 99 needs to jump higher for the note 242.

The horizontal length (width) of each of note symbols 242 to 244 indicates the length of the jump for the note, which corresponds to the duration of the note. For example, the note symbol 244 is horizontally wider than the note symbols 242 and 243, indicating that the user 99 needs to jump farther for the note 244.

Returning to FIG. 16, the playing process will be explained.

Figure 18:
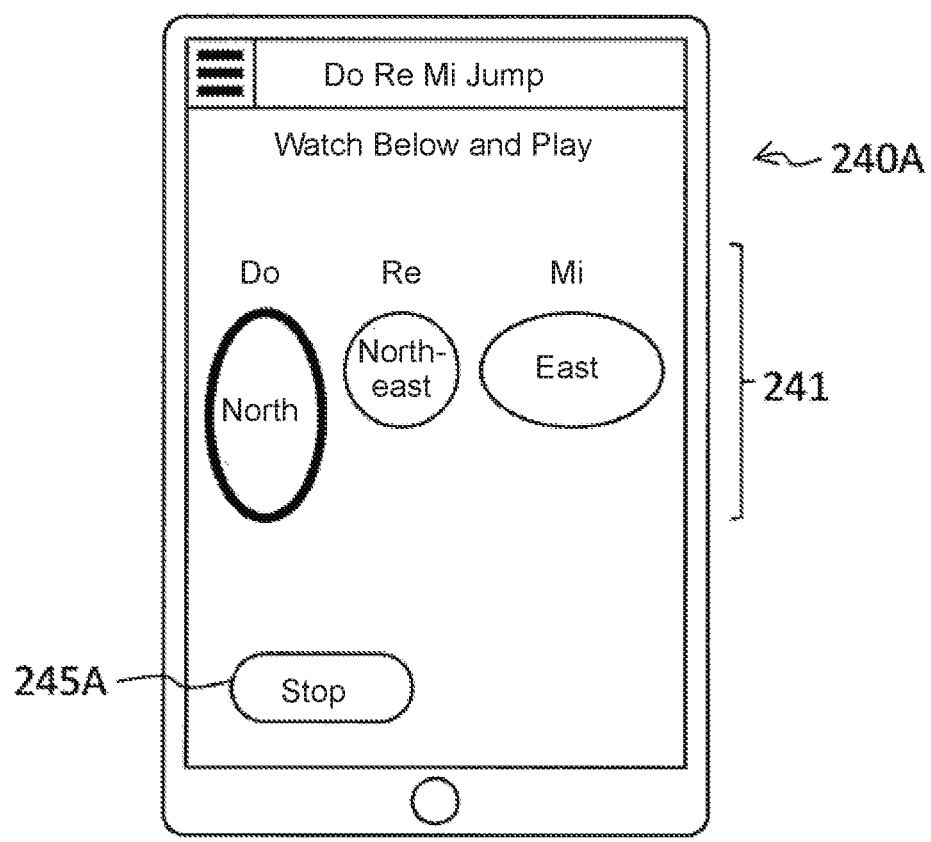
FIG. 18 is a screen image shown during the playing of the music playing game device of the first embodiment when the music playing game device shows playing instructions.

At step S221, the CPU 110 detects a tap on the "Start" button 245 (see FIG. 17). Thereafter, the playing device 100 is in the playing mode. FIG. 18 is a playing screen image 210A shown during the playing when the playing device 100 shows playing instructions. The "Start" button 245 (see FIG. 17) has changed to the "Stop" button 245A.

Returning to FIG. 16, at step S222, the CPU 110 highlights the next note symbol to be played. In detail, the CPU 110 displays the note symbol for the next note to be played by bold lines.

At step S223, the CPU 110 performs the jump and landing detection process. The jump and landing detection process will be described with reference to FIG. 20 below. The CPU 110 detects the direction, height, and distance of the jump by performing the jump and landing detection process.

At step S224, the CPU 110 judges whether the direction, height, and distance of the jump detected at step S223 respectively match the corresponding attributes of the "next note" that was supposed to be played, and stores the result of the judgement. If the jump matches the note (step S224->YES), the process moves to step S226, and if not (step S224->NO), the process moves to step S225.

At step S225, the CPU causes a buzzing sound to output from the speaker 133, and the process returns to step S223. Alternatively, the process may return to step S223 without emitting any sound, or may return to step S223 while highlighting the "next note" symbol that was supposed to be played.

At step S226, the CPU 110 outputs a sound having the pitch corresponding to the jump direction detected at step S223, the volume corresponding to the detected jump height, and the duration corresponding to the detected jump distance.

At step S227, the CPU 110 judges whether the note outputted at step S226 was the last note of the music piece (sound corresponding to the last note). If it was the last note (step S227->YES), the process moves to step S229, and if not (step S227->NO), the process moves to step S228.

At step S228, the CPU 110 causes the note symbol for the next note to be played subsequently to be highlighted, and the process returns to step S223.

At step S229, the CPU 110 grades the user's performance and displays the resulting score. In detail, the CPU evaluate the user's performance based on the number of times step S224 was YES and the number of times step S224 was NO, and causes the calculated score to be displayed on the score reporting screen 250 (see FIG. 19 described below). For example, if the number of YES at step S224 was 17, and the number of NO was 3, the score is calculated as 85 points obtained by (17/(17+3)×100=85.

Figure 19:
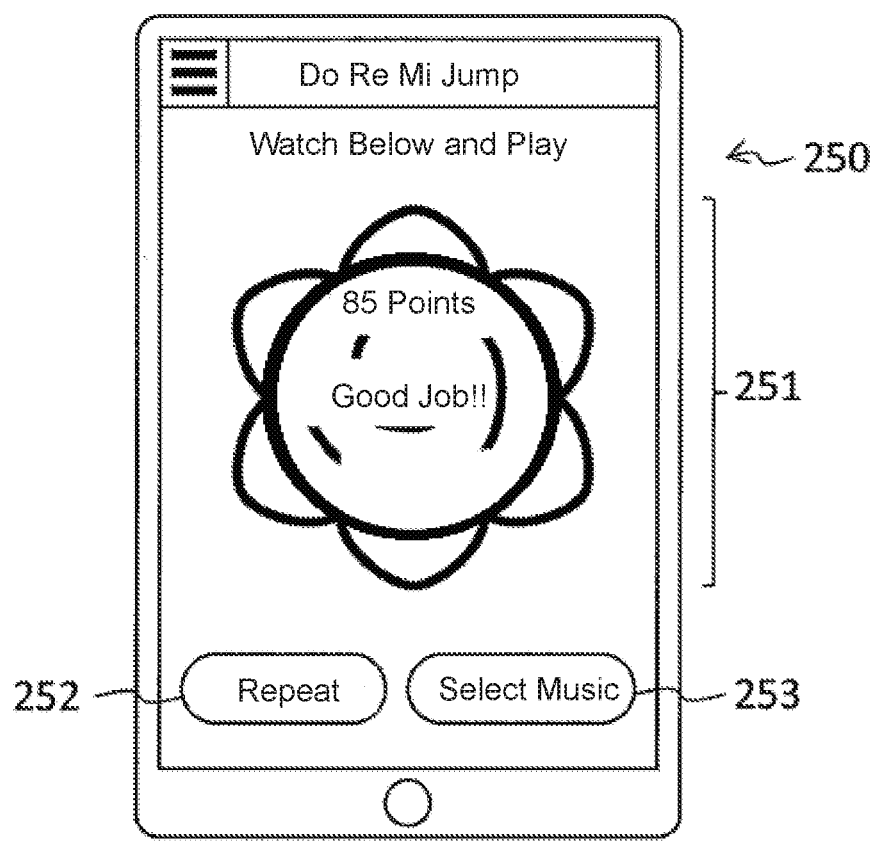
FIG. 19 is a score reporting screen image in the first embodiment.

FIG. 19 is a score reporting screen image 250 in the first embodiment. In the score display region 251, the calculated score is displayed. If the CPU 110 detects a tap on the "Repeat" button 252, the screen is switched to the playing screen 240 (see FIG. 17) so that the user 99 can play the same music piece again. If the CPU 110 detects a tap on the "Select Music" button 253, the screen is switched to the music selection screen 230 (see FIG. 15) so that the user 99 can change the music piece to be played.

Figure 20:
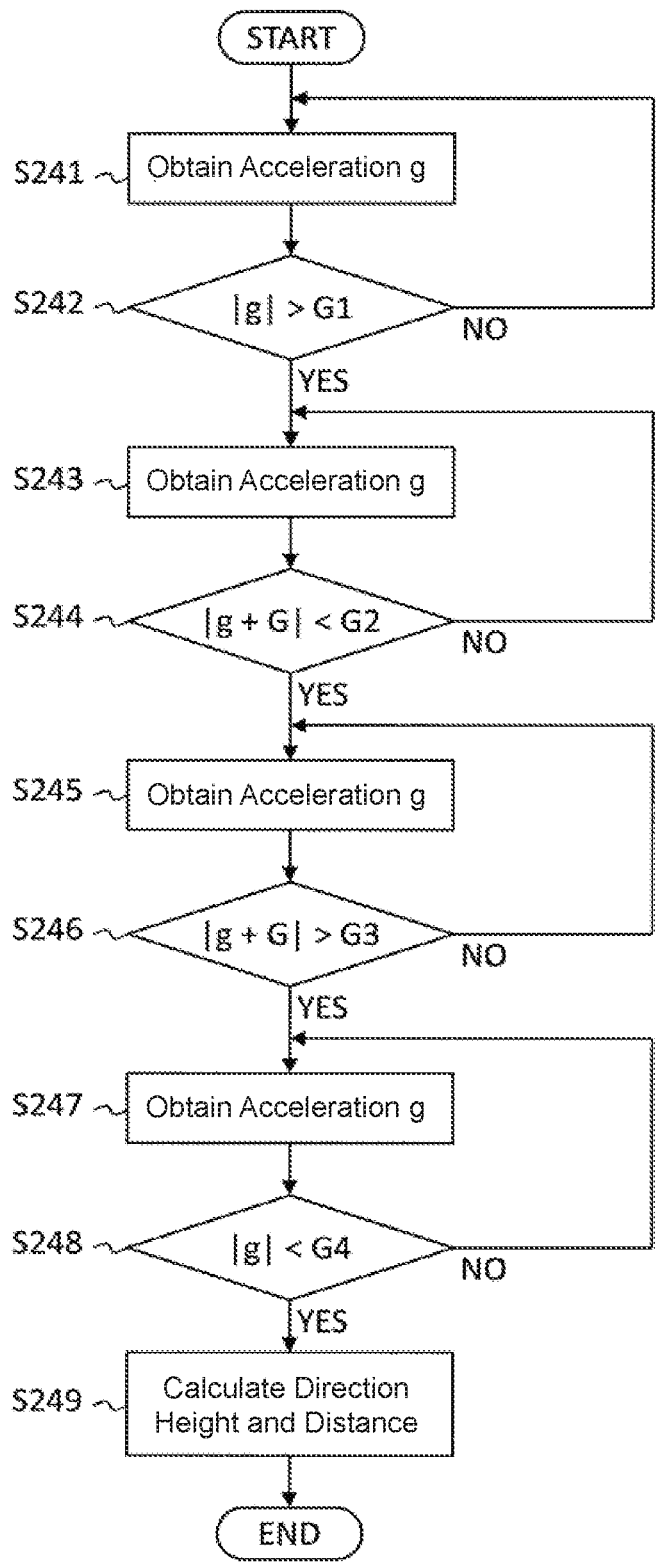
FIG. 20 is a flowchart showing processes for detecting jump and landing in the first embodiment when the music playing game device shows playing instructions.

FIG. 20 is a flowchart showing a process for detecting jump and landing in the first embodiment when the playing device 100 shows playing instructions. The jump and landing detection process shown in FIG. 20 are the same as the process shown in FIG. 13 except that step S161 is removed, and steps S241 to S249 respectively correspond to steps S162 to S170.

In the first embodiment described above, the playing device 100 calculates the direction, height, and the distance of the jump of the user 99 based on detected changes in accelerations, and causes a corresponding sound to emit. The user 99 plays the playing device 100 by jumping while looking at the playing instructions 900 on the ground (see FIG. 1) or while looking at the playing instructions displayed on the playing device 100 (playing instructions display region 241 in FIG. 17).

As compared with the conventional playground equipment, changing the playing instructions 900 drawn on the ground requires less working time and cost. Because of this, if users start losing interest, the playing instructions on the ground may be changed to those for a different music piece in order to attract more users. Further, maintenance is easy. Moreover, because the playing is performed by jumps on the ground, accidents are unlikely to occur. Thus, the playing device 100 is a highly versatile and safe playground equipment.

Modified Example of the First Embodiment: Restriction on Play Place

The user 99 who owns the playing device 100 can perform the above-mentioned playing anytime and anywhere as long as the music playing instructions are available. This is meritorious to the user 99, but may not be so for administrators of playgrounds and amusement parks because people may be less motivated to come to the playgrounds or amusement parks.

To solve this issue, the playing device 100 may be configured so that places where it can be played are restricted. For example, the playing device 100 may be configured such that its own position is detected using GNSS (Global Navigation Satellite System), and the playing process, such as those show in FIGS. 9 and 16 above, cannot be executed at places other than preset places. Further, instead of GNSS, the playing device 100 may be disabled if it cannot establish communications with a particular communication device(s) having a predetermined address(es) via short-distance wireless communication such as NFC (Near Field Communication) or Bluetooth™. For example, a short-distance wireless communication tag may be embedded into the start point 901 and note points 902 to 907 that constitute the playing instructions 900 (see FIG. 10) so that the user 99 can play the playing device 100 only when it is placed near the playing instructions 900 on the ground.

Modified Example of the First Embodiment: Direction Detection

In the embodiment described above, the directions for Do, Re, Mi, Fa, So, La, Ti, and Do are respectively north, northeast, east, southeast, south, southwest, west, and northwest, and the range of the angles for each note is 45 degrees (see FIG. 2). Alternatively, when a music piece is selected and a note to be played next is determined, the range of angle for the next note may be enlarged.

Figure 21:
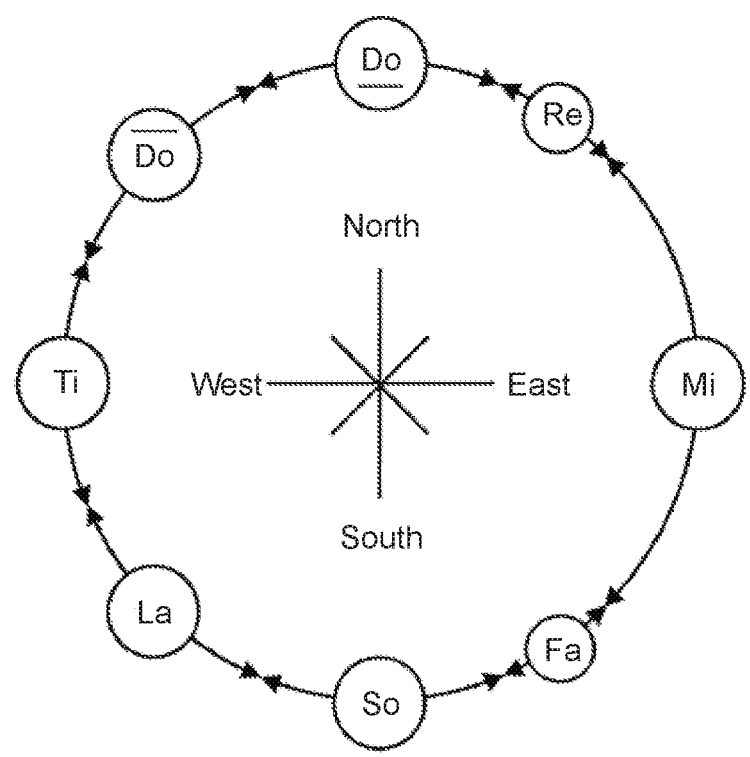
FIG. 21 shows a relationship between the direction of jump and the pitch of a note according a modified example of the first embodiment.

FIG. 21 shows a relationship between the direction of the jump and the pitch of a note according a modified example of the first embodiment. When the next note is Mi during the playing of the playing device 100 with reference to the playing instructions, the angle range for Mi is enlarged to 90 degrees, as compared with regular 45 degrees. As a result, for Re and Fa that are adjacent to Mi, the angle range is set to 22.5 degrees. The CPU 110 enlarges the angle range for the next note in calculating the jump direction in step S249 (see FIG. 20).

By enlarging the angle range for the next note, even if the user 99's jump direction deviates a little, the playing device 100 can emit the correct note sound. Even if the user 99 is a young child and cannot jump in the correct direction, the playing device 100 can emit the correct note sound and the user 99 can enjoy the playing.

In the embodiments described above, one octave corresponds to 360 degrees. Then, for example, a music piece that has a melody line of do, so, do, so, the corresponding note points on the map (see FIG. 1) overlap with each other. To deal with this issue, Do, Re, Mi, Fa, So, La, Ti, and Do may be assigned to (setting north as 0 degree) −70+−10 degrees, −50+−10 degrees, −30+−10 degrees, −10+−10 degrees, 10+−10 degrees, 30+−10 degrees, 50+−10 degrees, and 70+−10 degrees, respectively, so that the note points do not overlap each other in such a case.

Modified Example of the First Embodiment: Sound Output Immediately after Jump

Figure 22:
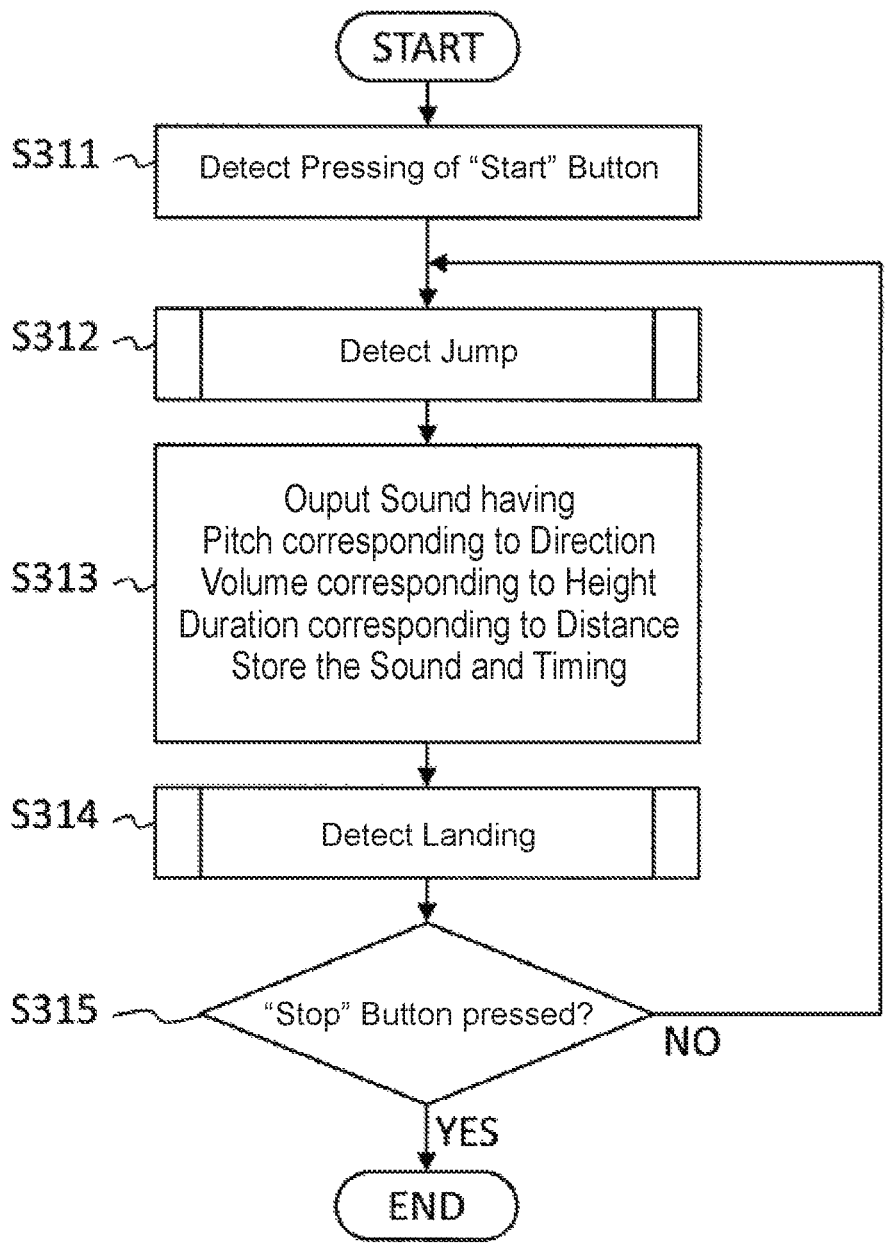
FIG. 22 is a flowchart for a playing process in a modified example of the first embodiment.

In the embodiments described above, the playing device 100 emits sound after the user 99 lands after jumping. Alternatively, the sound may be emitted at a moment the jump is detected. FIG. 22 is a flowchart for a playing process in this modified example of the first embodiment. As compared with the playing process of FIG. 9, the jump and landing detection step S142 is divided into the jump detection step S312 (see FIG. 23 described below) and the landing detection step S314 (see FIG. 24 described below), which is performed after outputting sound.

Figure 23:
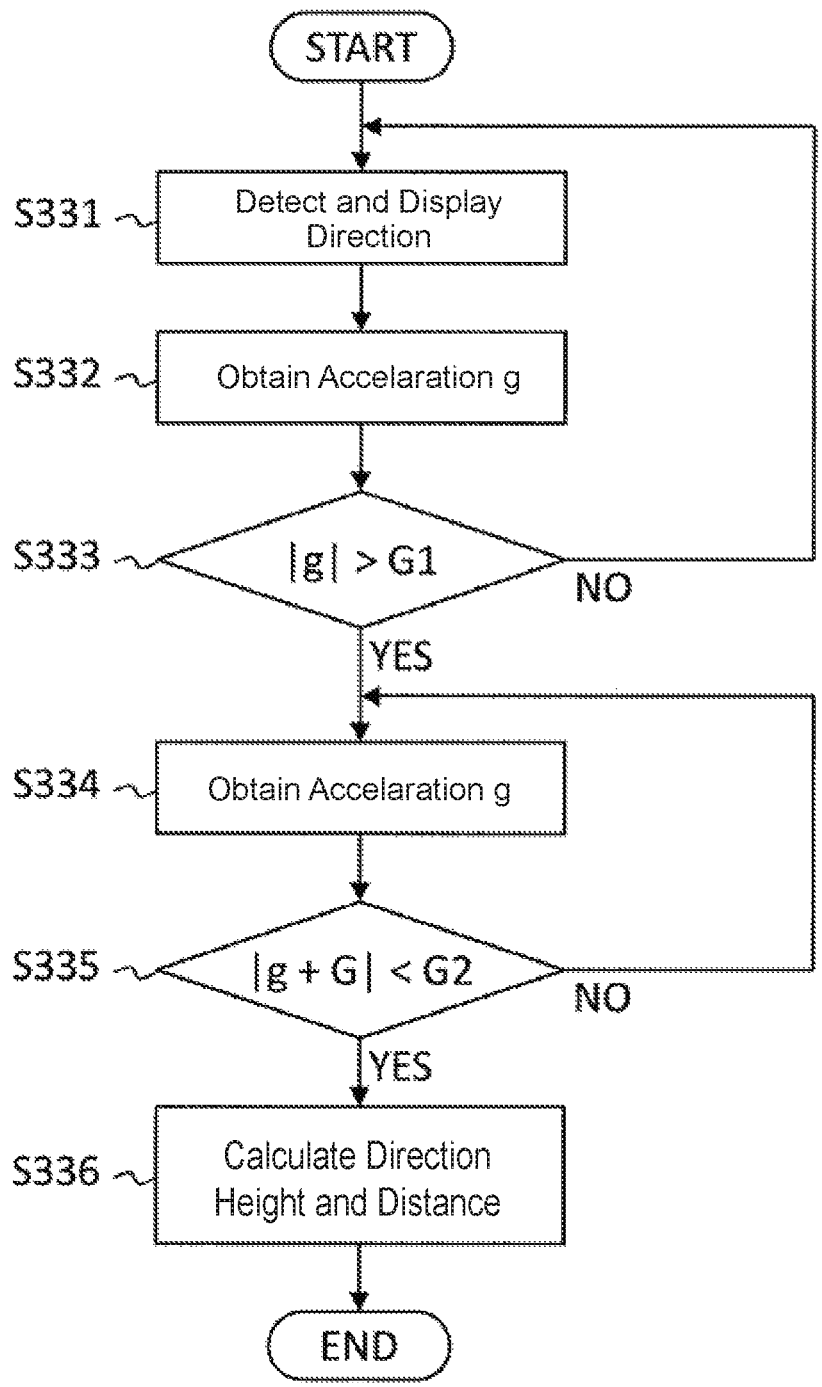
FIG. 23 is a flowchart for detecting jump in a modified example of the first embodiment.

FIG. 23 is a flowchart for the jump detection in the modified example of the first embodiment. This jump detection process is constructed of the jump detection process that in the above-described jump and landing detection process of FIG. 13 (i.e., the first part thereof), and a calculation process for calculating the direction, height, and distance of the jump. In more detail, steps S331 to S335 are similar to steps S161 to S165, and step S336 is similar to step S170.

Figure 24:
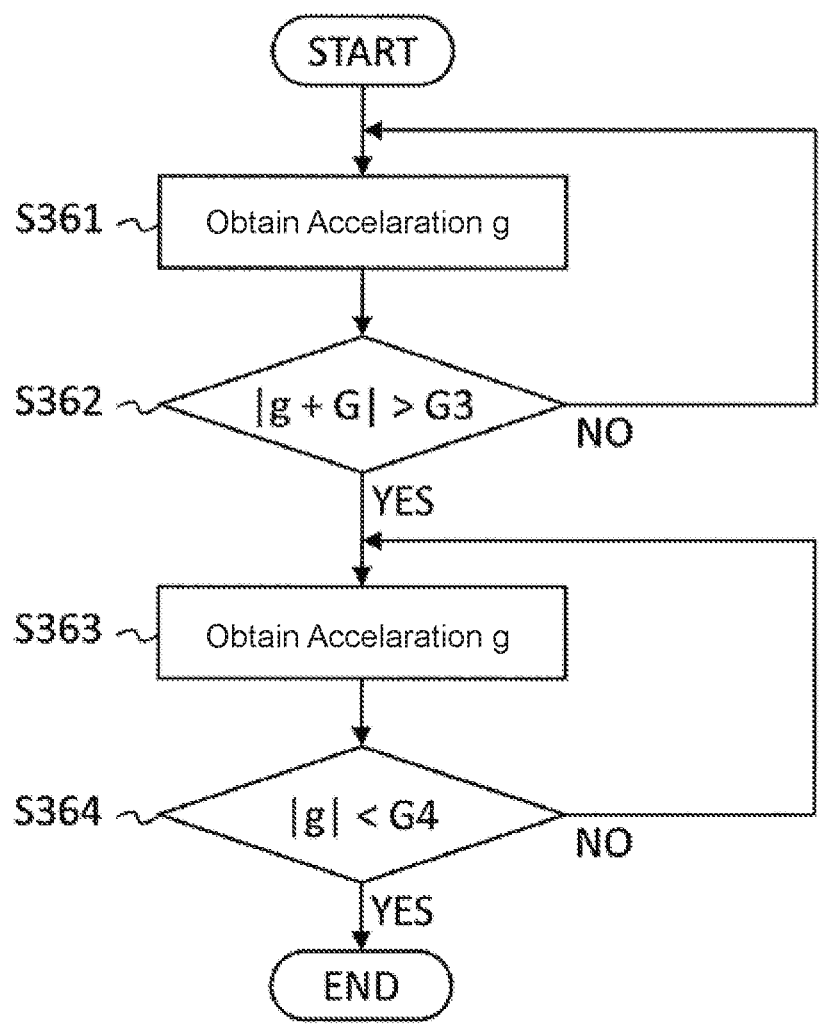
FIG. 24 is a flowchart for detecting landing in a modified example of the first embodiment.

FIG. 24 is a flowchart for detecting a landing in the modified example of the first embodiment. This landing detection process is similar to the landing detection process in the above-described jump and landing detection process of FIG. 13 (i.e., the latter part thereof). In more detail, steps S361 to S364 are similar to steps S166 to S169.

In this modified example, the playing device 100 emits sound at a moment the jump is detected (i.e., when the feet leave the ground, not when the landing is detected). Because of this, user 99 can enjoy the play with differing timings.

Modified Example of the First Embodiment: Sound Output at Once

In the embodiments described above, the playing device 100 emits sound every time the jump is detected since the time the "Start" button 214 (see FIG. 6) is tapped until the time the "Stop" button 214A (see FIG. 11) is tapped. Alternatively, the playing device 100 may be configured such that it does not emit sound when performing (jumping), and emits sound (reproduces the performance) when the "Listen" button 215 (see FIG. 12) is tapped. In this case, direction data and sound data based on the direction data due to jumps may be stored in a memory, and when the "Listen" button 215 is tapped, the note sounds are sequentially output based on the stored direction data.

Alternatively, the playing device 100 may be configured such that if no jump is detected for a prescribed time after the last jump is detected since the time the "Start" button 214 is tapped, the CPU 110 automatically determines that the playing is over, and outputs note sounds based on the jumps that have been detected since the time the "Start" button was tapped. It may also be configured such that if a new jump(s) is detected subsequently, and if no jump is detected for a prescribed time thereafter, the CPU automatically outputs the corresponding note sound based on the new jump(s).

Modified Example of the First Embodiment: Direction Detection

In the embodiments described above, in detecting directions, the CPU 110 assumes that the user 99 holds the playing device vertically with the display operation unit 135 facing the user 99 (see FIG. 1). Even when the user 99 holds the playing device 100 in an oblique manner (i.e., not vertically), the CPU 110 may assume that the display operation unit 135 is facing the user 99 in detecting directions. In more detail, when the playing device 100 is held in an oblique manner, the CPU 110 calculates a direction that is perpendicular to the gravitational acceleration and that is the closest to the direction of the rear of the playing device 100 (which is opposite to the direction in which the display operation unit 135 is facing) and regards such a direction as the direction in which the user 99 is facing. When the playing device 100 is held horizontally, the CPU 110 determines the direction in which the top of the playing device 100 is facing (the side farthest from the user 99) and regards it as the direction in which the user 99 is facing.

Modified Example of the First Embodiment: Tone Selection Process: Jump Instead of "Select" Button In the tone selection process (see FIG. 7), when the "Select" button 222 (see FIG. 8) is pressed (tapped), the selection of the tone (instrument) is finalized. Instead, the tone selection may be finalized when a jump is detected. Similarly, in the music selection process (see FIG. 15), instead of detecting a tap on the "Select" button 232, a jump may be detected to confirm the music piece selection.

Modified Example of the First Embodiment: Tone Selection Process: Tap Detection Instead of Rotation Detection In the tone selection process of the embodiment above, the CPU 110 highlights the instrument tone in accordance with the rotation angle(s) detected in steps S121-S122 (see FIG. 7). Alternatively, the CPU 110 may highlight the instrument note by detecting a tap. For example, an instrument that was tapped on the instrument selection region 221 (see FIG. 8) may be detected and highlighted. In this case, if the "Select" button is tapped thereafter, the highlighted instrument is selected as an instrument tone to be output from the speaker 133, and stored. Similarly, in the music selection process (see FIG. 15), a music piece that was tapped may be detected and highlighted, and upon detecting a tap on the "Select" button 232, the selection may be finalized.

Modified Example of the First Embodiment: Tone Selection Process: Selection During Play In the embodiments described above, the paying is performed after a tone is selected (see FIG. 5). In addition to this feature, a tone may be changed/selected by a rotating jump at the same place during the playing of the playing device 100. When the user 99 performs a rotating jump at the same location, during the time period T1 (see FIG. 10), a vertical acceleration is detected, but no horizontal acceleration is detected (i.e., the detected horizontal acceleration is smaller than a prescribed minimum, or the initial velocity that is obtained by integrating accelerations is smaller than a prescribed minimum).

When such a jump is detected, the CPU 110 may calculate a rotation angle based on outputs from the direction sensor 131 during the time period T1 and outputs from the direction sensor 131 during the time period T3 and may select the tone (instrument) based on the thus calculated rotation angle. For example, assuming that a tone will be changed every 60 degrees, if the CPU 110 detects a rotation jump of 120 degrees while the current tone is harmonica, the tone may be changed to guitar (see FIG. 8). When switching the tone, the CPU may change the playing screen 210A (see FIG. 11) to the tone selection screen 220.

By enabling the tone selection by rotation jumps during the playing, the user 99 no longer needs to perform a tone selection by operating the menu 211 (see FIG. 11) and by switching to the tone selection screen 220. Therefore, the user 99 may switch the tone during the playing at a desired timing.

Second Embodiment

In the first embodiment, the user plays the playing device 100 by jumping while holding a portable playing device 100. In some circumstances or applications, holding the playing device 100 may interfere with jumping. A second embodiment will improve this point.

Figure 25:
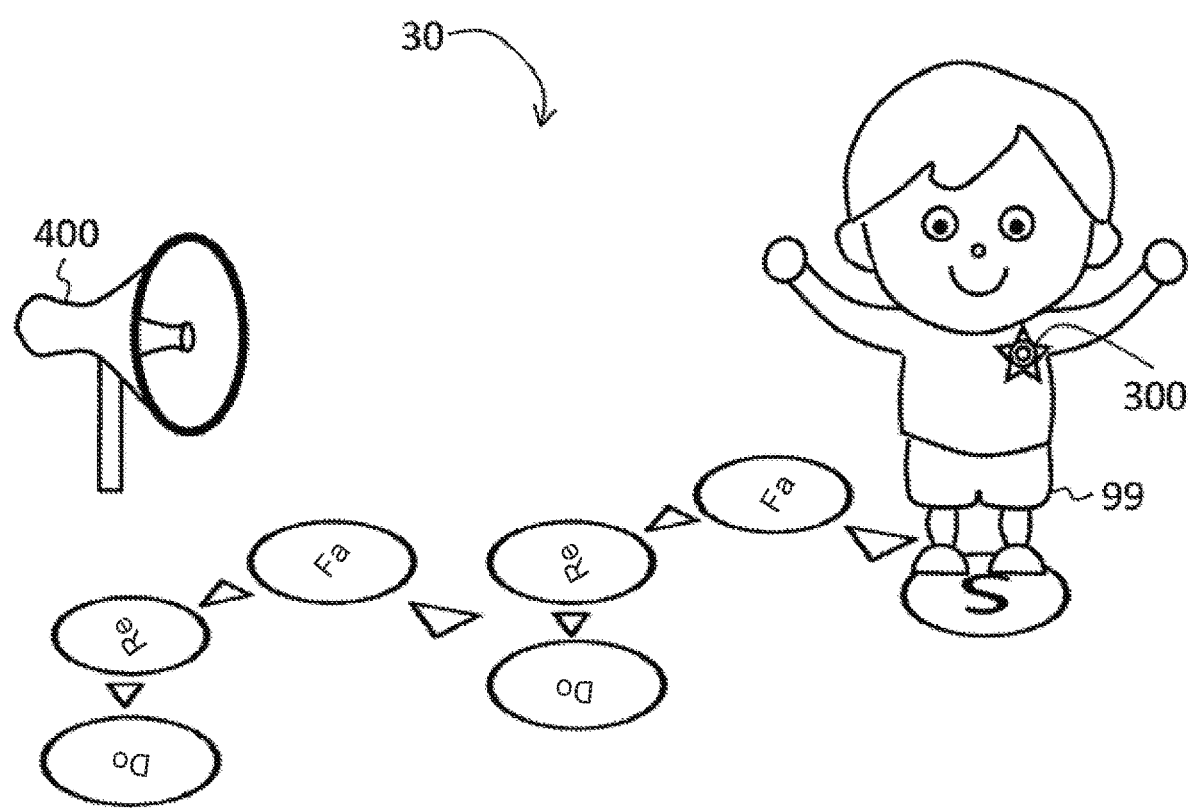
FIG. 25 schematically shows how to play a music playing system according to a second embodiment of the present invention.

FIG. 25 schematically shows how to play a music playing system 30 according to a second embodiment of the present invention. The playing system 30 includes a portable device 300 in the shape of a badge and a main device 400. The portable device 300 and the main device 400 are connected to each other via wireless communications.

The user 99 jumps while wearing the portable device 300 of a badge shape that has sensors, instead of holding the playing device 100. The portable device 300 transmits to the main device 400 information on directions and accelerations at prescribed intervals (for example, periodically at a prescribed frequency).

Figure 26:
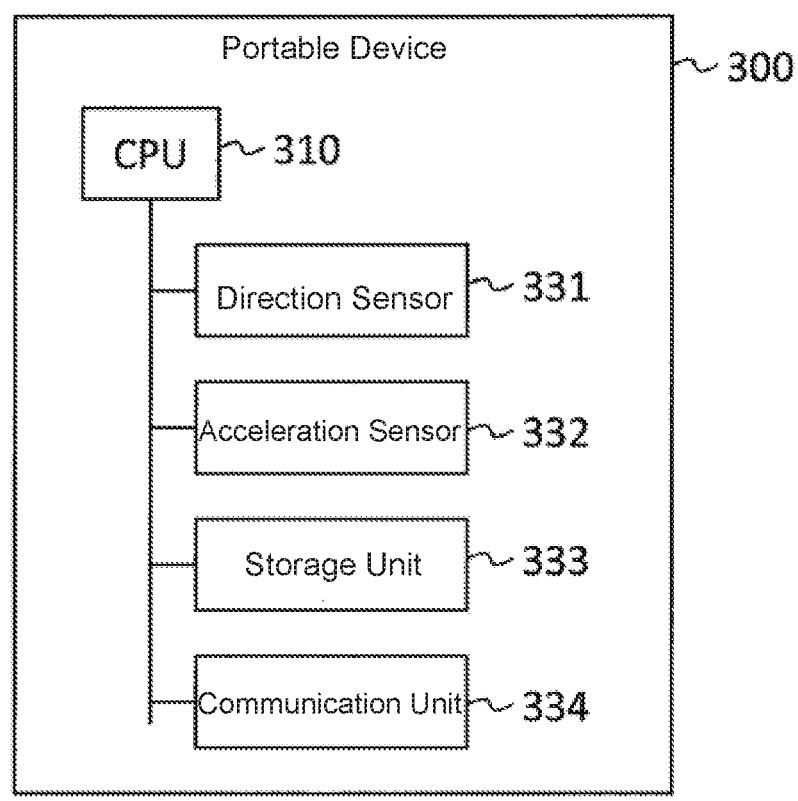
FIG. 26 is a block diagram showing an overall configuration of a mobile device of the music playing system of the second embodiment.

FIG. 26 is a block diagram showing an overall configuration of the mobile device 300 in the second embodiment. The portable device 300 includes a CPU 310, a direction sensor 331, an acceleration sensor 332, a storage unit 333, and a communication unit 334. The communication unit 334 is a device for transmitting data to the main device 400. The CPU 310 executes programs stored in the storage unit 333 and causes direction information detected by the direction sensor 331 and acceleration information detected by the acceleration sensor 332 to be transmitted to the main device 400 at prescribed intervals.

Figure 27:
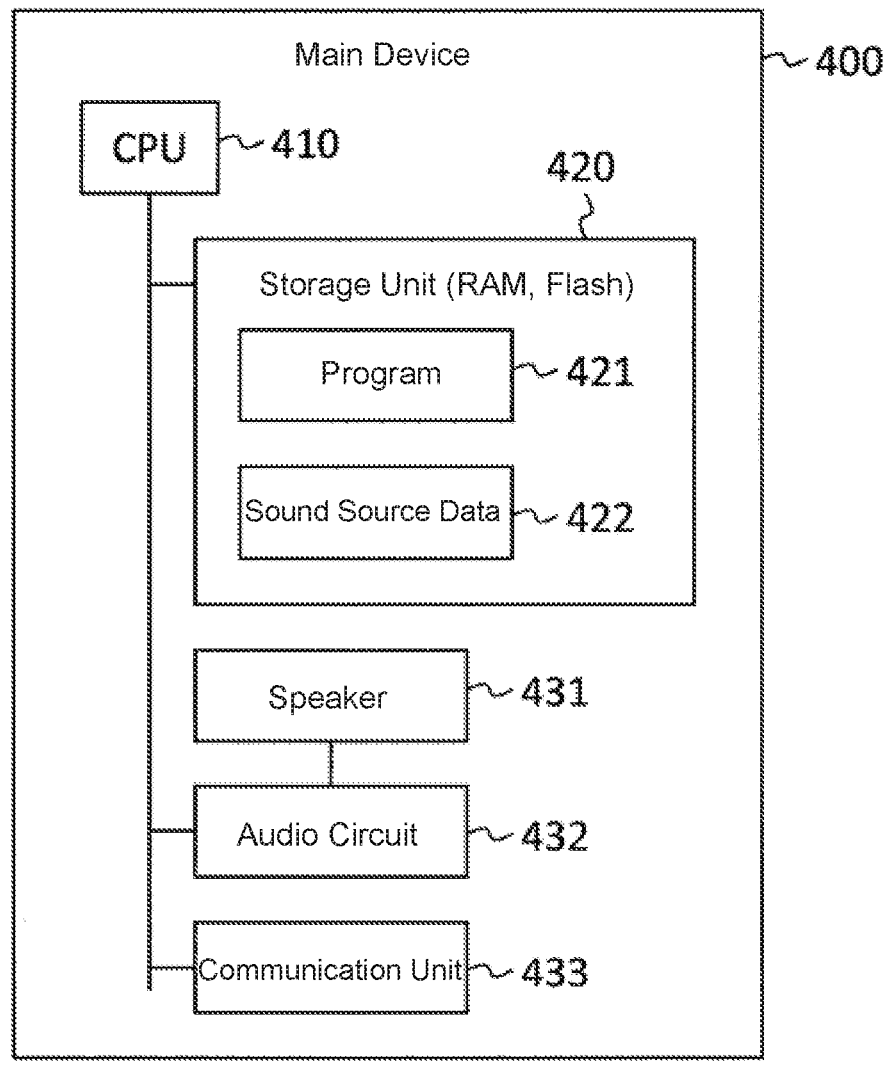
FIG. 27 is a block diagram showing an overall configuration of a main device of the music playing system of the second embodiment.

FIG. 27 is a block diagram showing an overall configuration of the main device 400 in the second embodiment. The main device 400 includes a CPU 410, a storage unit 420 that stores programs 421 and sound source data 422, a speaker 431, an audio circuit 432, and a communication unit 433. The CPU 410, the storage unit 420, the speaker 431, and the audio circuit 432 are similar to the CPU 110, the storage unit 120, the speaker 133, and the audio circuit 134. The communication unit 433 receives the direction information and acceleration information transmitted by the portable device 300.

In the first embodiment, the CPU 110 obtains the direction and acceleration information directly from the direction sensor 131 and the acceleration sensor 132. In contrast, in the second embodiment, the CPU 410 obtains the direction and acceleration information from the direction sensor 332 and the acceleration sensor 332 in the portable device 300 via wireless communications.

Figure 28:
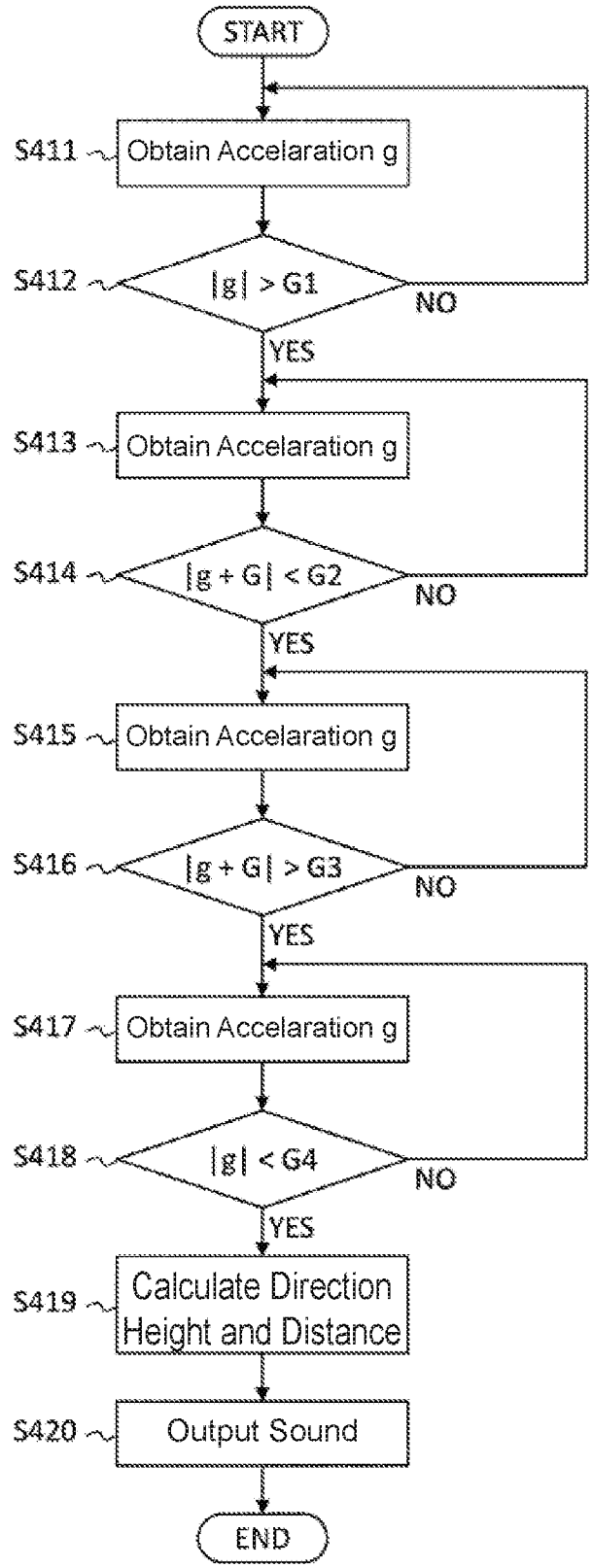
FIG. 28 is a flowchart for a playing process in the second embodiment.

FIG. 28 is a flowchart for a playing process in the second embodiment. The steps S411 to S419 are similar to steps S162 to S170, respectively, described in FIG. 13, except that the CPU 110 is changed to the CPU 410, the direction sensor 131 is changed to the direction sensor 331, and the acceleration sensor 132 is changed to the acceleration sensor 332.

At step S420, the CPU 410 causes the sound corresponding to the direction, height, and distance of the jump, which are calculated in step S419 to be output.

In the second embodiment, the user 99 does not hold the playing device 100 and only wears a light-weighted portable device 300 of a badge shape. Thus, the user 99 can jump with more ease and comfort.

Modified Example of the Second Embodiment: Operation Unit

In the second embodiment described above, the portable device 300 does not have an operation unit, and therefore, the user cannot operate the "Start" button 214 (see FIG. 6) or the "Stop" button 214A (see FIG. 11) to instruct the start and the end of the playing as in the case of the first embodiment. Alternatively, the portable 300 may be configured to have a button as an operation unit so that pressing operations of the button can be communicated to the main device 400 via wireless communications. In such a case, for example, the CPU 410 starts the playing process (see FIG. 28) when it receives a signal indicating that the button is pressed, and ends the playing process when it receives a signal indicating that the button is pressed again.

Third Embodiment

In the embodiments described above, the playing device 100 detects the direction in which the user jumped and emits a sound having a pitch corresponding to the detected jump direction. Instead, the pitch of the emitted sound may be based on the direction of the user when the user landed.

Figure 29:
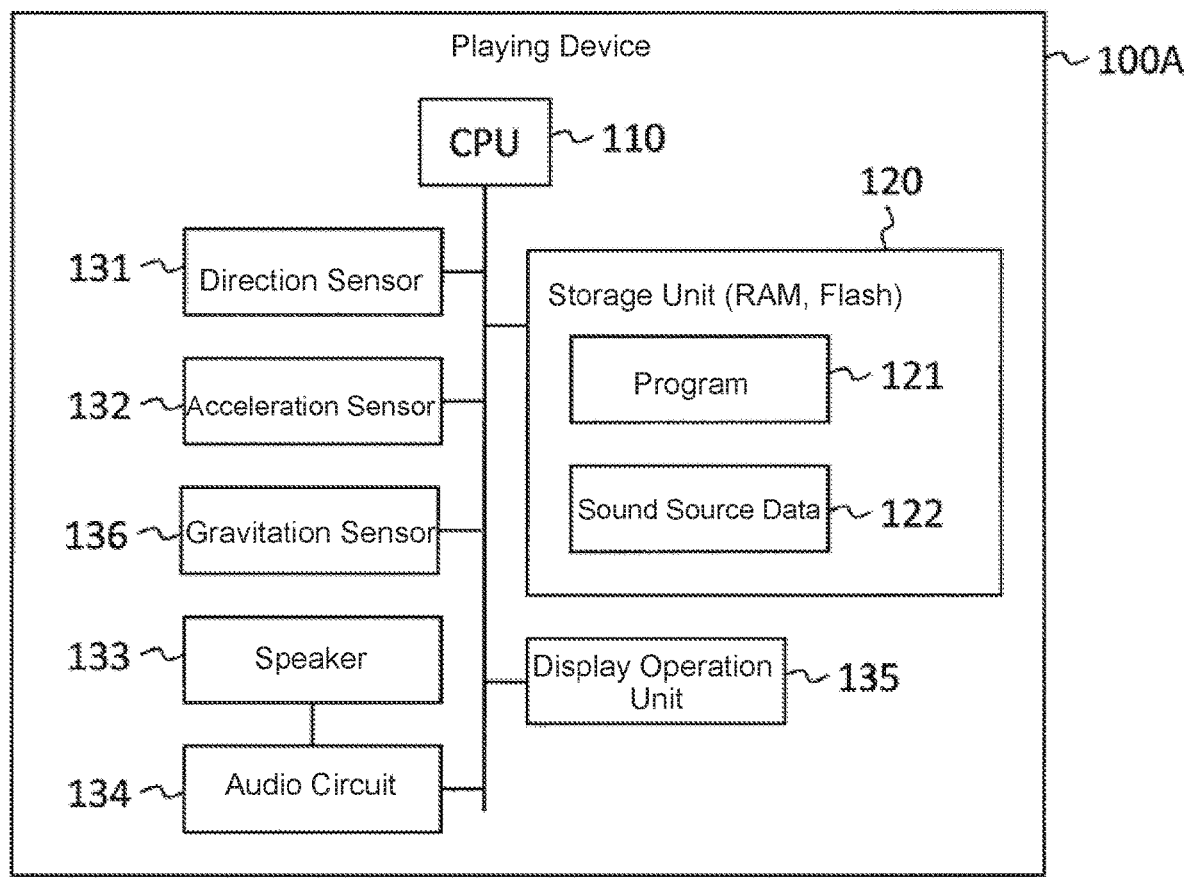
FIG. 29 is a block diagram showing an overall configuration of a music playing game device according to a third embodiment of the present invention.

FIG. 29 is a block diagram showing an overall configuration of a music playing game device 100A according to a third embodiment of the present invention. As compared with the playing device 100 (see FIG. 4), the playing device 100A further includes a gravitation sensor 136. The gravitation sensor 136 detects the direction of the gravitational force applied to the playing device 100A (i.e., the direction towards which the ground is located). By this direction, the inclination of the playing device 100A, such as facing upward (i.e., the display operation unit 135 is facing upwards), may be detected. Here, the gravitation sensor 136 may not be a physical device, and may be realized as a function of the CPU 110, which calculates the gravitation direction based on the outputs from the other sensors that include the acceleration sensor 132.

Figure 30:
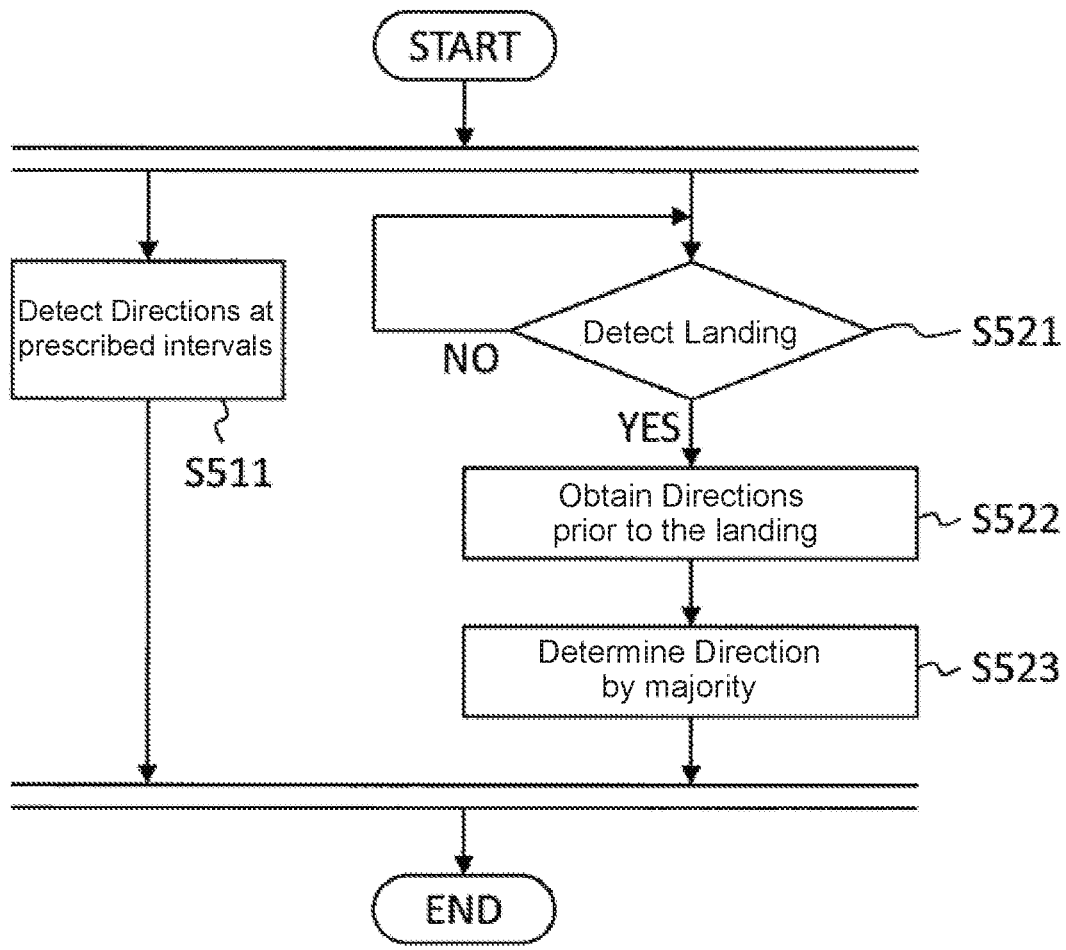
FIG. 30 is a flowchart for a direction detection process in the third embodiment.

FIG. 30 is a flowchart for a direction detection process in the third embodiment. Referring to FIG. 30, the process of detecting the direction of the playing device 100A when the user landed will be explained. Here, the CPU 110 performs step S511 and steps S521 to S523 at the same time in parallel.

At step S511, the CPU 110 detects directions at prescribed intervals, and stores data of a plurality of the detected directions in a memory. In more detail, at prescribed intervals, the CPU 110 obtains the orientation of the playing device 100A using the gravitation sensor 136, and obtains the orientation of the geomagnetism using the direction sensor 131 to calculate and store the direction of the playing device 100A (the direction in which the user is facing). The calculated direction is converted (rounded) to either one of north, northeast, east, southeast, south, southwest, west and northwest, and stored as the direction data at the prescribed intervals.

At step S521, if the landing is detected (step S521->YES), the process moves to step S522, and if not (step S521->NO), the process returns to step S521. At the moment of the detection of the landing, the process goes to step S522.

Figure 31:
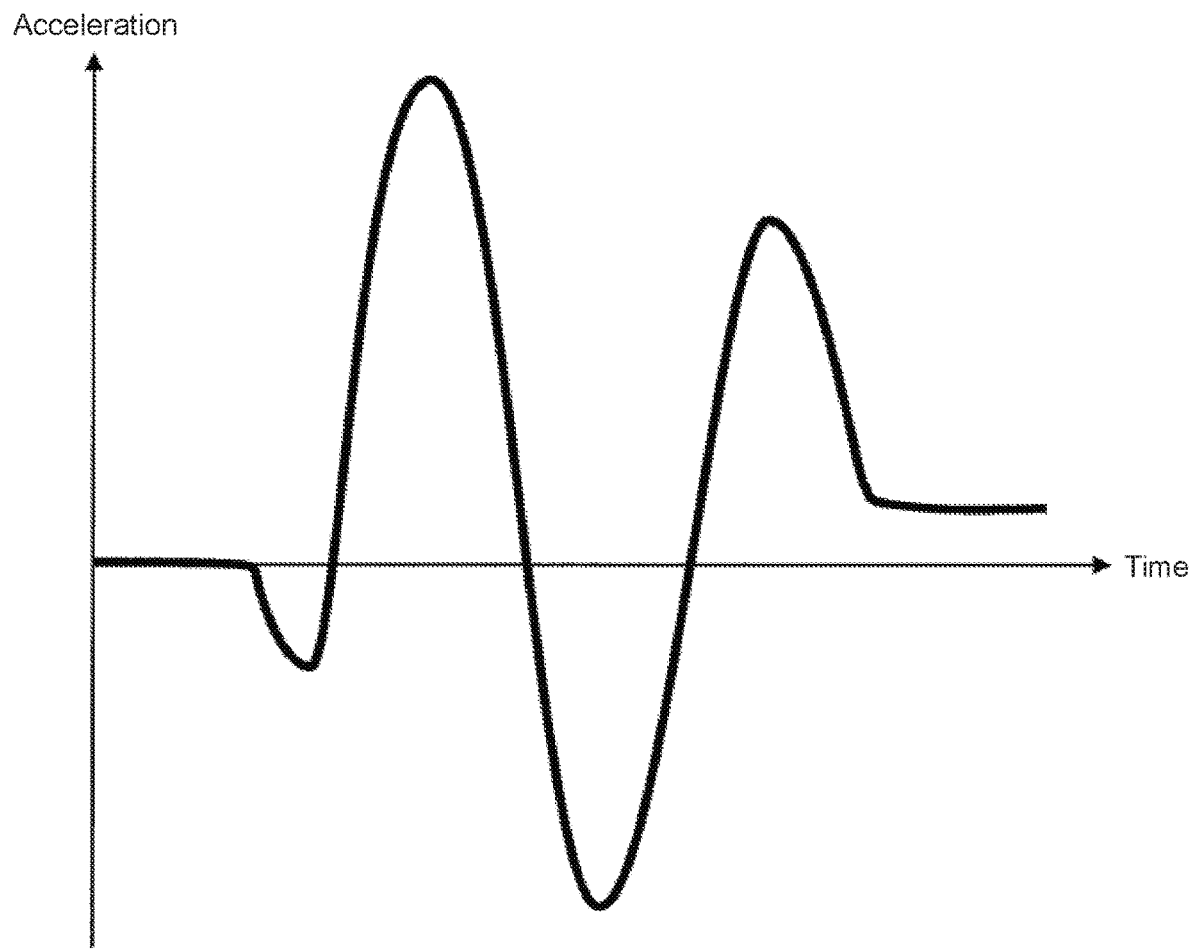
FIG. 31 is a graph showing changes in acceleration when landing in the third embodiment.

FIG. 31 is a graph showing changes in acceleration when the landing occurs in the third embodiment. The CPU 310 detects the landing by detecting changes in magnitude of acceleration that look similar to the graph shown in FIG. 31.

At step S522, the CPU 110 obtains data of a prescribed number of detected directions that are most recent relative to the time of the landing, among data of the plurality of the detected directions that have been stored in step S511.

At step S523, the CPU 110 picks the direction that is majority among the prescribed number of the detected directions obtained at step S522 as the determined direction of the playing device 100A.

In the third embodiment, even where it would be difficult or impossible to determine the direction of the playing device 100A using only the acceleration sensor 132, it becomes possible to reliably obtain the direction of the playing device 100A by using the gravitation sensor 136. Thus, the direction of the landing can be obtained, and a sound corresponding to the direction of the user's landing can be emitted.

In FIG. 13, the CPU calculates the direction, height, and distance of the jump by detecting the jump and the landing. The CPU 110 may replace this process with the direction detection process of FIG. 30. The height and the distance may be set to prescribed values, or alternatively, may be set to values corresponding to an amount(s) of acceleration change (for example, the maximum value and/or the difference between the maximum value and the minimum value) when the landing is detected.

Modified Example of the Third Embodiment

In the embodiment described above, at step S511, the CPU 110 obtains the orientation of the playing device 100A using the gravitation sensor 136, and obtains the orientation of the geomagnetism using the direction sensor 131 in order to calculate the direction of the playing device 100A. For example, if the OS (Operating System) of the playing device 100A is Android™, the orientation of the gravitational force relative to the XYZ axes of the playing device 100A is obtained by the gravitation sensor 136, and the orientation of the geomagnetism relative to the XYZ axes of the playing device 100A is obtained by the direction sensor 131, which is a geomagnetism sensor.

In this case, for example, at step S511, the CPU 110 calculates the direction at 100 msec intervals, and eight (8) most recent detected directions are stored (or extracted). At step S523, the CPU 110 picks the direction that is majority among these 8 stored directions as the direction of the playing device 100A.

If the OS of the playing device 100A is iOS™, there is an API (Application Programing Interface) that can obtain the direction of the playing device 100A. Thus, without obtaining the orientations of the gravitational force or geomagnetism, the direction of the playing device 100A can be obtained. In the case of iOS, for example, at step S511, the CPU 110 obtains the direction of the playing device 100A using the API at 20 msec intervals and stores ten (10) most recent detected directions. At step S523, the CPU 110 picks the direction that is majority among these 10 stored directions as the direction of the playing device 100A.

Other Modified Examples

The triangles 911 to 916 of the playing instructions 900 are not limited to triangle shapes. For example, any other symbol or letters, such as arrows, indicating the playing order of the notes 902 to 907 may be used instead. Also, in the playing instructions display region 241 (see FIG. 17), the direction in which the jump is to be performed is indicated by letters. However, an oriented arrow, or a symbol indicating a direction may be used instead.

Further, the portable device 300 (see FIG. 25) is not limited to a badge shape type. It may have the shape of a belt or a cord instead. It may have the shape of the clothes, such as shirt, pant (slacks pant), or skirt.

In the embodiments described above, the user 99 plays the playing device 100 by jumping while holding the playing device 100. However, the user 99 does not have to be a human. A robot that can read the playing instructions (see the playing instructions 900 of FIG. 1 and the playing instructions display region 241 of FIG. 17) can play the playing device 100. Furthermore, the playing device 100 may be equipped with a camera, and the playing device 100 may be configured such that the camera captures an image of the playing instructions 900, and the playing device 100 analyzes the pitch and duration of the sound to be emitted by referring to the directions and positional relationship between the note symbols, and outputs the corresponding sound.

In the embodiments above, directions (north, northeast, east, southeast, south, southwest, west, and northwest) are assigned to pitches (Do, Re, Mi, Fa, So, La, Ti, and Do). But the present invention is not limited thereto.

For example, the pitch may be determined relative to the direction in which the user was facing before the jump (performance). If the user faces east before playing, Do may be assigned to east, and Re, Mi, Fa, . . . , may be assigned to every prescribed angles in a clockwise direction using the east direction as a reference.

In the present disclosure, various steps in the playing process, the note selection process, and the music selection process may be performed in a successive manner as described above, or alternatively, may not be performed successively; some of which may be performed in parallel at the same time or may be separately performed.

It will be apparent to those skilled in the art that various modifications and variations can be made in the present invention without departing from the spirit or scope of the invention. Thus, it is intended that the present invention cover modifications and variations that come within the scope of the appended claims and their equivalents. In particular, it is explicitly contemplated that any part or whole of any two or more of the embodiments and their modifications described above can be combined and regarded within the scope of the present invention.

What is claimed is:

1. A portable device, comprising:
a speaker;
an acceleration sensor that detects movement of the device;
a geomagnetism sensor that detects a direction in which the device is facing; and
a processor that is configured to perform the following:
a first detection process of detecting a jump action of a user carrying the portable device based on an output from the acceleration sensor;
a second detection process of detecting the direction of the portable device based on an output from the geomagnetism sensor when the jump action is detected in the first detection process;
a third detection process of detecting a landing action of the user carrying the portable device based on an output from the acceleration sensor after the jump action is detected in the first detection process; and
an output control process of causing a sound having a pitch associated with the direction of the portable device detected in the second detection process to be output from the speaker based on a timing at which the landing action is detected in the third detection process.

2. The portable device according to claim 1,
wherein in the first detection process, the processor further detects a jump height of the jump action based on an output of the acceleration sensor that represents an acceleration in a direction of a gravitational force, and
wherein in the output control process, the processor causes the sound having a volume associated with the jump height detected in the first detection process to be output from the speaker.

3. The portable device according to claim 2, wherein in the output control process, the processor causes the sound to be output such that the volume of the sound is larger as the jump height is larger.

4. The portable device according to claim 1,
wherein in the first detection process, the processor further detects a jump distance of the jump action based on an output of the acceleration sensor that represents an acceleration in a direction perpendicular to a direction of a gravitational force, and
wherein in the output control process, the processor causes the sound having a duration associated with the jump distance detected in the first detection process to be output from the speaker.

5. The portable device according to claim 4, wherein in the output control process, the processor causes the sound to be output such that the duration of the sound is larger as the jump distance is larger.

6. The portable device according to claim 2,
wherein in the first detection process, the processor further detects a jump distance of the jump action based on an output of the acceleration sensor that represents an acceleration in a direction perpendicular to the direction of the gravitational force, and
wherein in the output control process, the processor causes the sound having a duration associated with the jump distance detected in the first detection process to be output from the speaker.

7. A method performed by a processor in a portable device that includes, in addition to said processor, a speaker; an acceleration sensor that detects movement of the device; and a geomagnetism sensor that detects a direction in which the device is facing, the method comprising via the processor:

a first detection process of detecting a jump action of a user carrying the portable device based on an output from the acceleration sensor;
a second detection process of detecting the direction of the portable device based on an output from the geomagnetism sensor when the jump action is detected in the first detection process;
a third detection process of detecting a landing action of the user carrying the portable device based on an output from the acceleration sensor after the jump action is detected in the first detection process; and
an output control process of causing a sound having a pitch associated with the direction of the portable device detected in the second detection process to be output from the speaker based on a timing at which the landing action is detected in the third detection process.

8. A non-transitory computer readable storage medium storing a program executable by a processor in a portable device that includes, in addition to the processor, a speaker; an acceleration sensor that detects movement of the device; and a geomagnetism sensor that detects a direction in which the device is facing, the program causing the processor to perform the following:

a first detection process of detecting a jump action of a user carrying the portable device based on an output from the acceleration sensor;
a second detection process of detecting the direction of the portable device based on an output from the geomagnetism sensor when the jump action is detected in the first detection process;
a third detection process of detecting a landing action of the user carrying the portable device based on an output from the acceleration sensor after the jump action is detected in the first detection process; and
an output control process of causing a sound having a pitch associated with the direction of the portable device detected in the second detection process to be output from the speaker based on a timing at which the landing action is detected in the third detection process.

\* \* \* \* \*